(12) United States Patent
Friesen et al.

(10) Patent No.: US 12,312,265 B2
(45) Date of Patent: May 27, 2025

(54) SYSTEMS AND METHODS FOR WATER TREATMENT AND STORAGE

(71) Applicant: Source Global, PBC, Scottsdale, AZ (US)

(72) Inventors: Grant Friesen, Scottsdale, AZ (US); Paul Johnson, Scottsdale, AZ (US); Susan Armijo, Scottsdale, AZ (US)

(73) Assignee: SOURCE Global, PBC, Scottsdale, AZ (US)

(*) Notice: Subject to any disclaimer, the term of this patent is extended or adjusted under 35 U.S.C. 154(b) by 541 days.

(21) Appl. No.: 17/512,518

(22) Filed: Oct. 27, 2021

(65) Prior Publication Data

US 2022/0127172 A1 Apr. 28, 2022

Related U.S. Application Data

(60) Provisional application No. 63/106,093, filed on Oct. 27, 2020.

(51) Int. Cl.
*C02F 1/78* (2023.01)
*C02F 1/32* (2023.01)

(52) U.S. Cl.
CPC ............... *C02F 1/78* (2013.01); *C02F 1/32* (2013.01); *C02F 2209/001* (2013.01);
(Continued)

(58) Field of Classification Search
CPC .... C02F 1/78; C02F 1/32; C02F 1/001; C02F 1/66; C02F 1/00; C02F 1/04; C02F 1/68; C02F 9/00; C02F 2209/001; C02F 2209/003; C02F 2209/005; C02F 2209/05; C02F 2209/06; C02F 2209/006; C02F 2209/02; C02F 2209/10; C02F 2209/11; C02F 2209/00; C02F 2301/046;
(Continued)

(56) References Cited

U.S. PATENT DOCUMENTS 1,816,592 A 7/1931 Knapen
2,138,689 A 11/1938 Altenkirch
(Continued)

FOREIGN PATENT DOCUMENTS

CN 1774401 5/2006
CN 1325854 7/2007
(Continued)

OTHER PUBLICATIONS

Non-Final Office Action dated Jan. 17, 2020 in U.S. Appl. No. 15/528,366.
(Continued)

*Primary Examiner* — Akash K Varma
(74) *Attorney, Agent, or Firm* — Fish & Richardson P.C.

(57) ABSTRACT

This disclosure describes systems and methods for providing water to a user for consumption. Systems of the present disclosure can include a water management system including one or more a water treatment flow path for receiving source water, disinfection unit(s), additive unit(s), sensor(s) for maintaining various water conditions. Additionally, water management, treatment and/or storage systems including controller(s) and associated methods of operating are also described for dispensing water to a user.

35 Claims, 9 Drawing Sheets

(52) U.S. Cl.
CPC .. *C02F 2209/003* (2013.01); *C02F 2209/005* (2013.01); *C02F 2209/05* (2013.01); *C02F 2209/06* (2013.01); *C02F 2301/046* (2013.01)

(58) Field of Classification Search
CPC ...... B01D 35/00; B01D 35/027; B01D 35/02; B01D 2313/243; A47K 3/00; F25D 21/00; F25D 21/14
USPC ........................................................ 210/760
See application file for complete search history.

(56) References Cited

U.S. PATENT DOCUMENTS

| | | |
|---|---|---|
| 2,284,914 A | 6/1942 | Miller |
| 2,462,952 A | 3/1949 | Dunkak |
| 2,700,537 A | 1/1955 | Pennington |
| 2,761,292 A | 9/1956 | Coanda et al. |
| 3,102,532 A | 9/1963 | Shoemaker |
| 3,400,515 A | 9/1968 | Ackerman |
| 3,676,321 A | 7/1972 | Cummings et al. |
| 3,683,591 A | 8/1972 | Glav |
| 3,740,959 A | 6/1973 | Foss |
| 3,844,737 A | 10/1974 | Macriss et al. |
| 3,889,532 A | 6/1975 | Pilie et al. |
| 3,889,742 A | 6/1975 | Rush et al. |
| 4,054,124 A | 10/1977 | Knoos |
| 4,080,186 A | 3/1978 | Ockert |
| 4,117,831 A | 10/1978 | Bansal et al. |
| 4,134,743 A | 1/1979 | Macriss et al. |
| 4,136,672 A | 1/1979 | Hallanger |
| 4,146,372 A | 3/1979 | Groth et al. |
| 4,169,459 A | 10/1979 | Ehrlich |
| 4,185,969 A | 1/1980 | Bulang |
| 4,201,195 A | 5/1980 | Sakhuja |
| 4,219,341 A | 8/1980 | Hussmann |
| 4,222,244 A | 9/1980 | Meckler |
| 4,234,037 A | 11/1980 | Rogers et al. |
| 4,242,112 A | 12/1980 | Jebens |
| 4,285,702 A | 8/1981 | Michel et al. |
| 4,304,577 A | 12/1981 | Ito et al. |
| 4,315,599 A | 2/1982 | Biancardi |
| 4,334,524 A | 6/1982 | McCullough |
| 4,342,569 A | 8/1982 | Hussmann |
| 4,345,917 A | 8/1982 | Hussmann |
| 4,351,651 A | 9/1982 | Courneya |
| 4,374,655 A | 2/1983 | Grodzka et al. |
| 4,377,398 A | 3/1983 | Bennett |
| 4,398,927 A | 8/1983 | Asher et al. |
| 4,405,343 A | 9/1983 | Othmer |
| 4,433,552 A | 2/1984 | Smith |
| 4,478,210 A | 10/1984 | Sieradski |
| 4,722,192 A | 2/1988 | Koblitz et al. |
| 4,726,817 A | 2/1988 | Roger |
| 4,926,618 A | 5/1990 | Ratliff |
| 5,058,388 A | 10/1991 | Shaw et al. |
| 5,213,773 A | 5/1993 | Burris |
| 5,275,643 A | 1/1994 | Usui |
| 5,470,484 A | 11/1995 | McNeel |
| 5,579,647 A | 12/1996 | Calton et al. |
| 5,701,749 A | 12/1997 | Zakryk |
| 5,718,122 A | 2/1998 | Maeda |
| 5,729,981 A | 3/1998 | Markus et al. |
| 5,758,511 A | 6/1998 | Yoho et al. |
| 5,826,434 A | 10/1998 | Belding et al. |
| 5,846,296 A | 12/1998 | Krumsvik |
| 5,873,256 A | 2/1999 | Denniston |
| 5,989,313 A | 11/1999 | Mize |
| 6,029,467 A | 2/2000 | Moratalla |
| 6,156,102 A | 12/2000 | Contad et al. |
| 6,199,388 B1 | 3/2001 | Fischer, Jr. |
| 6,336,957 B1 | 1/2002 | Tsymerman |
| 6,447,583 B1 | 9/2002 | Thelen et al. |
| 6,490,879 B1 | 12/2002 | Lloyd et al. |
| 6,511,525 B2 | 1/2003 | Spletzer et al. |
| 6,513,339 B1 | 2/2003 | Kopko |
| 6,557,365 B2 | 5/2003 | Dinnage et al. |
| 6,574,979 B2 | 6/2003 | Faqih |
| 6,644,060 B1 | 11/2003 | Dagan |
| 6,828,499 B2 | 12/2004 | Max |
| 6,869,464 B2 | 3/2005 | Klemic |
| 6,945,063 B2 | 9/2005 | Max |
| 6,957,543 B1 | 10/2005 | Reznik |
| 7,017,356 B2 | 3/2006 | Moffitt |
| 7,043,934 B2 | 5/2006 | Radermacher et al. |
| 7,178,355 B2 | 2/2007 | Moffitt |
| 7,251,945 B2 | 8/2007 | Tongue |
| 7,305,849 B2 | 12/2007 | Loffler et al. |
| 7,306,654 B2 | 12/2007 | King et al. |
| 7,478,535 B2 | 1/2009 | Turner, Jr. et al. |
| 7,740,765 B2 | 6/2010 | Mitchell |
| 7,866,176 B2 | 1/2011 | Vetrovec et al. |
| 7,905,097 B1 | 3/2011 | Fort |
| 7,926,481 B2 | 4/2011 | Edwards et al. |
| 8,075,652 B2 | 12/2011 | Melikyan |
| 8,118,912 B2 | 2/2012 | Rodriguez et al. |
| 8,187,368 B2 | 5/2012 | Shih |
| 8,196,422 B2 | 6/2012 | Ritchey |
| 8,328,904 B2 | 12/2012 | Griffiths et al. |
| 8,425,660 B2 | 4/2013 | Ike et al. |
| 8,506,675 B2 | 8/2013 | Ellsworth |
| 8,844,299 B2 | 9/2014 | Ferreira et al. |
| 8,876,956 B2 | 11/2014 | Ball et al. |
| 9,289,718 B2 | 3/2016 | Dahlback |
| 10,357,739 B2 | 7/2019 | Friesen et al. |
| 10,469,028 B2 | 11/2019 | Friesen et al. |
| 10,632,416 B2 | 4/2020 | Friesen et al. |
| 10,835,861 B2 | 11/2020 | Friesen et al. |
| 11,159,123 B2 | 10/2021 | Friesen et al. |
| 11,160,223 B2 | 11/2021 | Friesen et al. |
| 11,266,944 B2 | 3/2022 | Friesen et al. |
| 11,281,997 B2 | 3/2022 | Friesen et al. |
| 11,285,435 B2 | 3/2022 | Friesen et al. |
| 2002/0130091 A1 | 9/2002 | Ekberg et al. |
| 2003/0091881 A1 | 5/2003 | Eisler |
| 2003/0101161 A1 | 5/2003 | Ferguson et al. |
| 2004/0000165 A1 | 1/2004 | Max |
| 2004/0055309 A1 | 3/2004 | Bellows et al. |
| 2005/0044862 A1 | 3/2005 | Vetrovec et al. |
| 2005/0084415 A1 | 4/2005 | McVey et al. |
| 2005/0204914 A1 | 9/2005 | Boutall |
| 2005/0249631 A1 | 11/2005 | Schulz et al. |
| 2005/0284167 A1 | 12/2005 | Morgan |
| 2006/0017740 A1 | 1/2006 | Coleman |
| 2006/0032493 A1 | 2/2006 | Ritchey |
| 2006/0060475 A1 | 3/2006 | Applegate et al. |
| 2006/0112709 A1 | 6/2006 | Boyle |
| 2006/0130654 A1 | 6/2006 | King et al. |
| 2006/0288709 A1 | 12/2006 | Reidy |
| 2007/0028769 A1 | 2/2007 | Eplee et al. |
| 2007/0101862 A1 | 5/2007 | Tongue |
| 2007/0150424 A1 | 6/2007 | Igelnik |
| 2007/0274858 A1 | 11/2007 | Childers et al. |
| 2007/0295021 A1 | 12/2007 | Tyls et al. |
| 2008/0135495 A1 | 6/2008 | Sher |
| 2008/0168789 A1 | 7/2008 | Jones |
| 2008/0202944 A1 | 8/2008 | Santoli et al. |
| 2008/0224652 A1 | 9/2008 | Zhu et al. |
| 2008/0245092 A1* | 10/2008 | Forsberg ................. F24F 1/027 62/3.4 |
| 2008/0289352 A1 | 11/2008 | Parent |
| 2009/0025711 A1 | 1/2009 | Edwards et al. |
| 2009/0093916 A1 | 4/2009 | Parsonnet et al. |
| 2009/0173376 A1 | 7/2009 | Spencer et al. |
| 2009/0211276 A1 | 8/2009 | Forkosh |
| 2009/0223514 A1 | 9/2009 | Smith et al. |
| 2010/0083673 A1 | 4/2010 | Meritt |
| 2010/0170499 A1 | 7/2010 | Bar |
| 2010/0192605 A1 | 8/2010 | Fang et al. |
| 2010/0212348 A1 | 8/2010 | Oh |
| 2010/0242507 A1 | 9/2010 | Meckler |
| 2010/0275629 A1 | 11/2010 | Erickson |
| 2010/0275775 A1 | 11/2010 | Griffiths et al. |
| 2010/0294672 A1 | 11/2010 | Gahr et al. |

(56) References Cited

U.S. PATENT DOCUMENTS

| | | | |
|---|---|---|---|
| 2010/0300868 A1* | 12/2010 | Pirone | B01D 1/225 202/175 |
| 2011/0048039 A1 | 3/2011 | Kohavi et al. | |
| 2011/0056220 A1 | 3/2011 | Caggiano | |
| 2011/0083458 A1 | 4/2011 | Takakura et al. | |
| 2011/0132027 A1 | 6/2011 | Gommed et al. | |
| 2011/0232485 A1 | 9/2011 | Ellsworth | |
| 2011/0247353 A1 | 10/2011 | Metz | |
| 2011/0296858 A1 | 12/2011 | Caggiano | |
| 2012/0006193 A1 | 1/2012 | Roychoudhury | |
| 2012/0125020 A1 | 5/2012 | Vandermeulen et al. | |
| 2012/0227582 A1 | 9/2012 | Wamstad et al. | |
| 2013/0227879 A1 | 9/2013 | Lehky | |
| 2013/0269522 A1 | 10/2013 | DeValve | |
| 2013/0312451 A1 | 11/2013 | Max | |
| 2013/0318790 A1 | 12/2013 | Becze et al. | |
| 2013/0319022 A1 | 12/2013 | Becze et al. | |
| 2014/0034475 A1 | 2/2014 | Kamen et al. | |
| 2014/0053580 A1 | 2/2014 | Ferreira et al. | |
| 2014/0110273 A1 | 4/2014 | Bar-or et al. | |
| 2014/0138236 A1 | 5/2014 | White | |
| 2014/0157985 A1 | 6/2014 | Scovazzo et al. | |
| 2014/0173769 A1 | 6/2014 | Leyns et al. | |
| 2014/0260389 A1 | 9/2014 | Sistla | |
| 2014/0317029 A1 | 10/2014 | Matsuoka et al. | |
| 2015/0033774 A1 | 2/2015 | Ferreira et al. | |
| 2015/0136666 A1* | 5/2015 | Tais Zamir | C02F 9/00 210/96.2 |
| 2015/0194926 A1 | 7/2015 | Bushong, Jr. | |
| 2016/0073589 A1 | 3/2016 | McNamara | |
| 2016/0131401 A1 | 5/2016 | Otanicar et al. | |
| 2016/0162456 A1 | 6/2016 | Munro et al. | |
| 2016/0187287 A1 | 6/2016 | Tajiri et al. | |
| 2016/0197364 A1 | 7/2016 | Rama | |
| 2016/0244951 A1 | 8/2016 | Yui | |
| 2016/0333553 A1 | 11/2016 | Dorfman | |
| 2017/0013810 A1 | 1/2017 | Grabell | |
| 2017/0024641 A1 | 1/2017 | Wierzynski | |
| 2017/0203974 A1 | 7/2017 | Riedl et al. | |
| 2017/0323221 A1 | 11/2017 | Chaudhuri et al. | |
| 2017/0354920 A1 | 12/2017 | Friesen et al. | |
| 2017/0371544 A1 | 12/2017 | Choi et al. | |
| 2018/0043295 A1 | 2/2018 | Friesen et al. | |
| 2018/0209123 A1 | 7/2018 | Bahrami et al. | |
| 2019/0025273 A1 | 1/2019 | Brondum | |
| 2019/0102695 A1 | 4/2019 | Biswas et al. | |
| 2019/0171967 A1 | 6/2019 | Friesen et al. | |
| 2019/0254243 A1 | 8/2019 | Friesen et al. | |
| 2019/0336907 A1 | 11/2019 | Friesen et al. | |
| 2019/0344214 A1 | 11/2019 | Friesen et al. | |
| 2019/0372520 A1 | 12/2019 | Friesen et al. | |
| 2020/0055753 A1 | 2/2020 | Minor et al. | |
| 2020/0122083 A1 | 4/2020 | Friesen et al. | |
| 2020/0124566 A1 | 4/2020 | Johnson et al. | |
| 2020/0140299 A1 | 5/2020 | Friesen et al. | |
| 2020/0209190 A1 | 7/2020 | Johnson et al. | |
| 2020/0269184 A1 | 8/2020 | Friesen et al. | |
| 2020/0283997 A1 | 9/2020 | Salloum et al. | |
| 2020/0286997 A1 | 9/2020 | Wu et al. | |
| 2020/0300128 A1 | 9/2020 | Friesen et al. | |
| 2021/0062478 A1 | 3/2021 | Friesen et al. | |
| 2021/0305935 A1 | 9/2021 | Friesen et al. | |
| 2022/0039341 A1 | 2/2022 | Friesen et al. | |
| 2022/0127172 A1 | 4/2022 | Friesen et al. | |
| 2022/0136270 A1 | 5/2022 | Gamboa et al. | |
| 2022/0156648 A1 | 5/2022 | Friesen et al. | |

FOREIGN PATENT DOCUMENTS

| | | | |
|---|---|---|---|
| CN | 101589282 | | 11/2009 |
| CN | 102042645 | | 5/2011 |
| CN | 102297503 | | 12/2011 |
| CN | 102422089 | | 4/2012 |
| CN | 102441320 | | 5/2012 |
| CN | 102733451 | | 10/2012 |
| CN | 202850099 | | 4/2013 |
| CN | 103889892 | | 6/2014 |
| CN | 203777907 | | 8/2014 |
| CN | 104813107 | | 7/2015 |
| CN | 204510348 | U | 7/2015 |
| CN | 105531547 | | 4/2016 |
| DE | 4215839 | | 11/1993 |
| EP | 1139554 | | 10/2001 |
| EP | 2305362 | | 4/2011 |
| EP | 2326890 | | 6/2011 |
| FR | 2813087 | | 2/2002 |
| JP | H06142434 | | 5/1994 |
| JP | H09285412 | | 10/1997 |
| JP | 2002-126441 | | 5/2002 |
| JP | 2003-148786 | | 5/2003 |
| JP | 2012101169 | | 5/2012 |
| KR | 20000003525 | | 2/2000 |
| WO | 1999007951 | | 2/1999 |
| WO | 2006129200 | | 12/2006 |
| WO | 2007041804 | | 4/2007 |
| WO | 2007051886 | | 5/2007 |
| WO | 2008018071 | | 2/2008 |
| WO | 2009043413 | | 4/2009 |
| WO | 2012009024 | | 1/2012 |
| WO | 2012128619 | | 9/2012 |
| WO | 2012162760 | | 12/2012 |
| WO | 2013026126 | | 2/2013 |
| WO | 2013182911 | | 12/2013 |
| WO | 2014085860 | | 6/2014 |
| WO | 2015054435 | | 4/2015 |
| WO | 2016053162 | | 4/2016 |
| WO | 2016081863 | | 5/2016 |
| WO | 2016138075 | | 9/2016 |
| WO | 2016187709 | | 12/2016 |
| WO | 2017177143 | | 10/2017 |
| WO | 2017201405 | | 11/2017 |
| WO | WO-2018200388 A1 * | 11/2018 | B01D 35/02 |
| WO | 2019014599 | | 1/2019 |
| WO | 2019050861 | | 3/2019 |
| WO | 2019050866 | | 3/2019 |
| WO | 2019071202 | | 4/2019 |
| WO | 2019113354 | | 6/2019 |
| WO | 2019161339 | | 8/2019 |
| WO | 2020082038 | | 4/2020 |
| WO | 2020086621 | | 4/2020 |
| WO | 2021154739 | | 8/2021 |

OTHER PUBLICATIONS

Final Office Action dated Apr. 27, 2020 in U.S. Appl. No. 15/528,366.
Notice of Allowance dated Jun. 19, 2020 in U.S. Appl. No. 15/528,366.
Notice of Allowance dated Jun. 3, 2019 in U.S. Appl. No. 15/600,046.
Non-Final Office Action dated Feb. 5, 2019 in U.S. Appl. No. 15/482,104.
Notice of Allowance dated Jun. 27, 2019 in U.S. Appl. No. 15/482,104.
Non-Final Office Action dated Aug. 9, 2019 in U.S. Appl. No. 16/517,435.
Notice of Allowance dated Jan. 31, 2020 in U.S. Appl. No. 16/517,435.
Non-Final Office Action dated Jun. 1, 2020 in U.S. Appl. No. 16/167,295.
Final Office Action dated Apr. 13, 2021 in U.S. Appl. No. 16/167,295.
Non-Final Office Action dated May 15, 2020 in U.S. Appl. No. 16/791,895.
Final Office Action dated Oct. 15, 2020 in U.S. Appl. No. 16/791,895.
Non-Final Office Action dated Apr. 30, 2021 in U.S. Appl. No. 16/278,608.
Non-Final Office Action dated Jul. 20, 2021 in U.S. Appl. No. 16/211,896.
Non-Final Office Action dated Jul. 26, 2021 in U.S. Appl. No. 16/630,824.
Non-Final Office Action dated Aug. 24, 2021 in U.S. Appl. No. 16/657,935.
Notice of Allowance dated Oct. 20, 2021 in U.S. Appl. No. 16/820,587.

(56) References Cited

OTHER PUBLICATIONS

Notice of Allowance dated Nov. 10, 2021 in U.S. Appl. No. 16/211,896.
Final Office Action dated Dec. 20, 2021 in U.S. Appl. No. 16/791,895.
International Search Report and Written Opinion dated Apr. 29, 2016 in Application No. PCT/US2015/061921.
International Search Report and Written Opinion in Aug. 16, 2017 in Application No. PCT/US2017/033540.
International Search Report and Written Opinion dated Jun. 19, 2017 in Application No. PCT/US2017/026609.
International Search Report and Written Opinion dated Dec. 3, 2018 in Application No. PCT/US2018/049411.
International Search Report and Written Opinion dated Dec. 3, 2018. Application No. PCT/US2018/049398.
International Search Report and Written Opinion dated Jan. 15, 2019 in Application No. PCT/US2018/054715.
International Search Report and Written Opinion dated Mar. 6, 2019 in Application No. PCT/US2018/042098.
International Search Report and Written Opinion dated Mar. 29, 2019 in Application No. PCT/US2018/064308.
International Search Report and Written Opinion dated Jun. 6, 2019 in Application No. PCT/US2019/018431.
International Search Report and Written Opinion dated Jul. 29, 2019 in Application No. PCT/US2019/32066.
International Search Report and Written Opinion dated Jan. 28, 2020 in Application No. PCT/US2019/057492.
International Search Report and Written Opinion dated Mar. 19, 2020 in Application No. PCT/US2019/057081.
International Search Report and Written Opinion dated Jun. 15, 2020 in Application No. PCT/US2020/029401.
International Search Report and Written Opinion dated Apr. 6, 2021 in Application No. PCT/US2021/015106.
European Search Report dated Jun. 7, 2019 in European Application No. 15825979.
European Search Report dated Jan. 28, 2020 in European Application No. 15825979.
Office Action dated Oct. 31, 2019 in Chinese Application No. 201780033378.3.
Office Action dated Apr. 6, 2021 in Chinese Application No. 201780033378.3.
Office Action dated Aug. 4, 2021 in Chinese Application No. 201780033378.3.
Office Action dated Nov. 1, 2021 in Chinese Application No. 201780033378.3.
Office Action dated Feb. 4, 2020 in Brazilian Patent Application No. 112017021842.9.
Office Action dated Apr. 28, 2021 in India Patent Application No. 20181704169.
Office Action dated Jul. 15, 2021 in Japanese Patent Application No. 2019-503636.
Office Action dated Jul. 29, 2021 in India Patent Application No. 202017005710.
Office Action dated Oct. 20, 2021 in Chinese Patent Application No. 201780044144.9.
Ali et al., "Desiccant Enhanced Nocturnal Radiative Cooling-Solar Collector System for Air Comfort Application in Hot Arid Areas," Int. J. of Thermal & Environmental Engineering, vol. 5, No. 1, pp. 71-82 (2013).
Anand et al., "Solar Cooling Systems for Climate Change Mitigation: A Review," Renewable and Sustainable Energy Reviews, vol. 41, pp. 143-161 (2015).
De Antonellis et al., "Simulation, Performance Analysis and Optimization of Desiccant Wheels," Energy and Buildings, vol. 42, No. 9, pp. 1386-1393 (2010).
Eriksson et al., "Diurnal Variations of Humidity and Ice Water Content in the Tropical Upper Troposphere," Atmos. Chem. Phys,. vol. 10, pp. 11519-11533 (2010).
European Solar Thermal Industry Federation (ESTIF), "Key Issues for Renewable Heat in Europe (K4RES-H)," Solar Assisted Cooling—WP3, Task 3.5, Contract EIE/04/204/S07.38607, pp. 1-21 (2006).
Ge et al., "A Mathematical Model for Predicting the Performance of a Compound Desiccant Wheel (A Model of a Compound Desiccant Wheel)," Applied Thermal Engineering, vol. 30, No. 8, pp. 1005-1015 (2010).
Kassem et al., "Solar Powered Dehumidification Systems Using Desert Evaporative Coolers: Review," International Journal of Engineering and Advanced Technology {IJEAT), ISSN: 2249-8958, vol. 3, Issue 1 (2013).
Kolewar et al., "Feasability of Solar Desiccant Evaporative Cooling: A Review," International Journal of Scientific & Engineering Research, ISSN: 2229-5518, vol. 5, Issue 10 (2014).
La et al., "Technical Development of Rotary Desiccant Dehumidification and Air Conditioning: A Review," Renewable and Sustainable Energy Reviews, vol. 14, pp. 130-147 (2010).
Nia et al., "Modeling and Simulation of Desiccant Wheel for Air Conditioning," Energy and Buildings, vol. 38, No. 10, pp. 1230-1239 (2006).
Kozubal et al.,"Desiccant Enhanced Evaporative Air-Conditioning {DEVap): Evaluation of a New Concept in Ultra Efficient Air Conditioning," National Renewal Energy Laboratory {NREL), Technical Report, NREL/TP-5500-49722 (2011).
Critoph et al., "Solar Energy for Cooling and Refrigeration," Engineering Department, University of Warwick, Coventry CV4 7AL, United Kingdom (1997).
Wahlgren, "Atmospheric Water Vapour Processor Designs for Potable Water Production: A Review," Wat. Res., vol. 35, No. 1, pp. 1-22 (2001).
Gad et al., "Application of a Solar Desiccant/Collector System for Water Recovery From Atmospheric Air," Renewal Energy, vol. 22, No. 4, pp. 541-556 (2001).
William et al., "Desiccant System for Water Production From Humid Air Using Solar Energy," Energy, vol. 90, pp. 1707-1720 (2015).
PV Performance Modeling Collaborative. (2014). Irradiance & Insolation. Accessed Aug. 18, 2021 at https://pvpmc.sandia.gov/modeling-steps/1-weather-design-inputs/irradiance-and-insolation-2/ (Year: 2014).
ACS. (2012). A Single-Layer Atmosphere Model. Accessed on Aug. 17, 2021 at https://www.acs.org/content/acs/en/ climatescience/atmosphericwarming/singlelayermodel.html (Year: 2012).
Materials Technology. (2010). UV Exposure Across Surface of Earth. Accessed Aug. 17, 2021 at http://www.drb-mattech.co.uk/uv%20map.html (Year: 2010).
Non-Final Office Action dated May 11, 2022 in U.S. Appl. No. 16/411,048.
Non-Final Office Action dated May 6, 2022 in U.S. Appl. No. 16/855,965.
Non-Final Office Action dated Mar. 2, 2022 in U.S. Appl. No. 16/630,824.
Notice of Allowance dated Feb. 4, 2022 in U.S. Appl. No. 16/644,465.
Notice of Allowance dated Mar. 7, 2022 in U.S. Appl. No. 16/644,487.
International Search Report and Written Opinion dated Feb. 16, 2022 in Application No. PCT/US2021/056910.

* cited by examiner

SYSTEMS AND METHODS FOR WATER TREATMENT AND STORAGE

CROSS REFERENCE TO RELATED APPLICATIONS

This application claims priority to, and the benefit of, U.S. Provisional Patent Application Ser. No. 63/106,093 filed on Oct. 27, 2020 entitled "SYSTEMS AND METHODS FOR WATER TREATMENT AND STORAGE", the disclosure of which is hereby incorporated by reference in their entirety.

TECHNICAL FIELD

This disclosure is related to systems and methods for water treatment and storage, and more particularly, to self-contained, automated systems and related methods for producing, treating, mineralizing, maintaining, storing and dispensing potable water.

BACKGROUND

Water treatment systems using ozone injection or ultraviolet (UV) irradiation to treat or purify water are known water treatment approaches. Moreover, water treatment systems that inject ozone or irradiate water with UV radiation before or after passage through a filter are common.

Certain challenges exist for water treatment and storage systems for producing potable water, storing the produced potable water and dispensing the potable water in an automated and deployable approach with high efficiency, high reliability and low cost. There exists a need for improved systems and methods for producing, storing and dispensing potable water.

BRIEF DESCRIPTION OF THE DRAWINGS

The following drawing figures illustrate by way of example and not limitation. For the sake of brevity and clarity, every feature of a given structure is not always labeled in every drawing figure in which that structure appears. Identical reference numbers do not necessarily indicate an identical structure. Rather, the same reference number may be used to indicate a similar feature or a feature with similar functionality, as may non-identical reference numbers. Views in the figures may be drawn to scale (unless otherwise noted), meaning the sizes of the depicted elements may be accurate relative to each other for at least the embodiment in the view.

Figure 1:
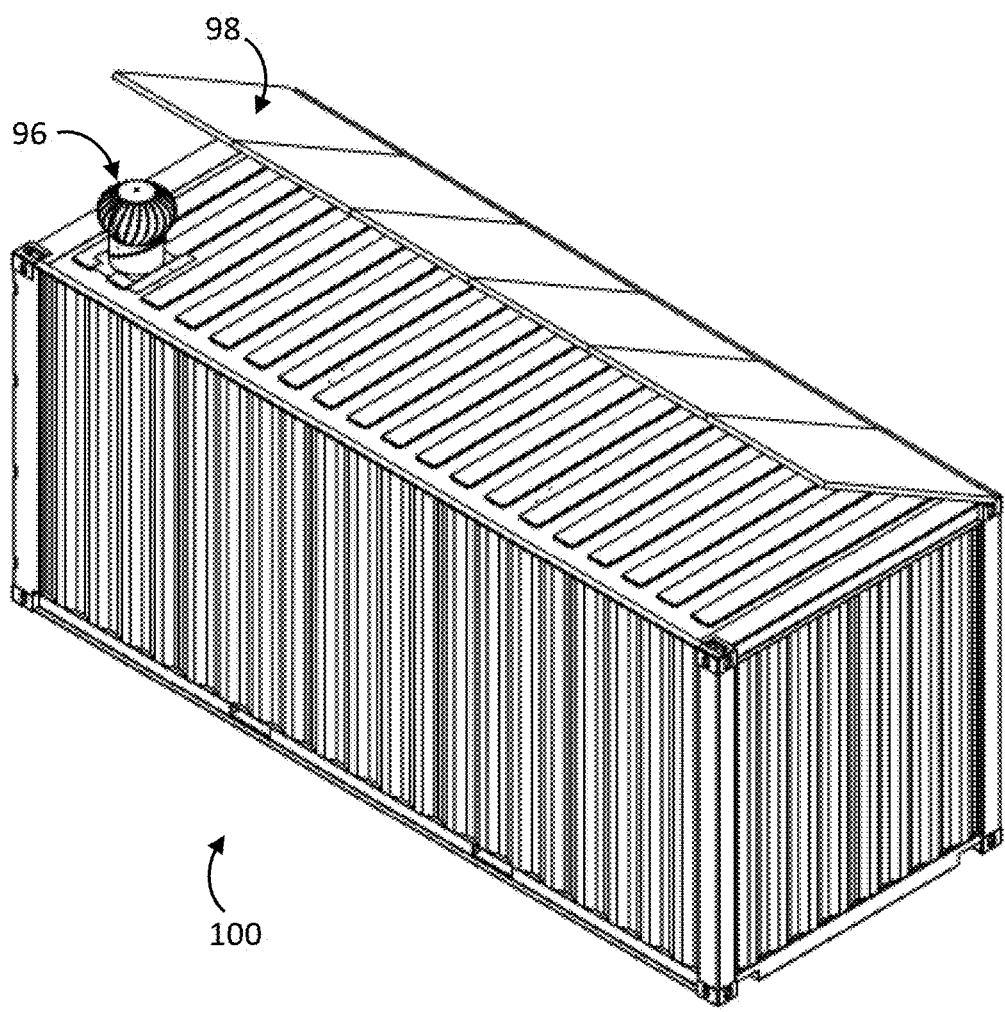
FIG. 1 illustrates a water treatment and storage system deployed as a shipping container, according to an exemplary embodiment.

For simplicity and clarity of illustration, the drawing figures show the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures can denote the same elements and/or functionality, again noting that identical reference numbers do not necessarily indicate an identical structure.

DESCRIPTION OF ILLUSTRATIVE EMBODIMENTS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure.

Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials.

This disclosure includes embodiments of systems and methods, such as, for example, for water treatment and storage. The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" and "approximately" may be substituted with "within [a percentage] of" what is specified, for example, where the percentage includes 0.1%, 1%, 5%, 10%, or the like. Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements Likewise, a method that "comprises," "has," "includes," or "contains" one or more operations or steps possesses those one or more operations or steps, but is not limited to possessing only those one or more operations or steps.

Any embodiment of any of the apparatuses, systems, and methods can consist of or consist essentially of—rather than comprise/include/contain/have-any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. The feature or features of one embodiment may be applied to other embodiments or implementations, even though not described or illustrated, unless expressly prohibited by this disclosure or the nature of the embodiments.

As will be described in detail below, this disclosure introduces various approaches for deployable and autonomous water treatment systems for producing potable water, storing produced potable water and dispensing potable water to an end user. Various systems and methods for producing, storing and dispensing potable water are described to enable an automated and self-contained approach with high efficiency and reliability.

In some embodiments, a water management system (e.g., a water treatment and storage system) can be deployed as a self-contained and/or modular shipping container having a standardized size (e.g., 10, 20 or 40 foot in length shipping container), but could be any other size container suitable for housing or containing some or all components of the water management systems disclosed herein. Referring now to the drawing figures, and more particularly to FIG. 1, water management system (e.g., a water treatment and storage system) 100 is deployed as a shipping container comprising a durable outer housing having walls extending between corner-connected frame members. The shipping container can be modified to facilitate airflow into or out of the interior volume (e.g., via vent or exhaust fan 96), facilitate input of an external water source for treatment by water management system 100 (e.g., via one or more water flow conduits), output or dispensing of treated water (e.g., via one or more outbound water flow conduits), and/or include onboard solar energy generation and/or solar thermal water production via solar panels (e.g., panels 98). Some advantages of deploying water treatment systems in a shipping container form factor include economic transportation, high durability and ease of installation. At an installation site, the water treatment and storage system can be delivered or unloaded as a complete or modular unit and can be operatively coupled to a water source quickly and easily, e.g., on a turn-key basis. In some embodiments, the water treatment and storage system can be delivered, unloaded, and/or installed without the assistance of specially trained technicians on site. In some embodiments, the water treatment and storage system can be delivered or unloaded as a complete unit including an onboard energy generation unit (e.g., photovoltaic panels) and a water generation unit (e.g., atmospheric solar thermal water generator) without any connection to any external energy or water source. Furthermore, the water treatment and storage system can be removed or relocated as a complete unit. The economics of a containerized water treatment and storage system can also be advantageous when intended to be permanent e.g., locations where access to municipal water treatment facilities is non-existent or limited.

Figure 2:
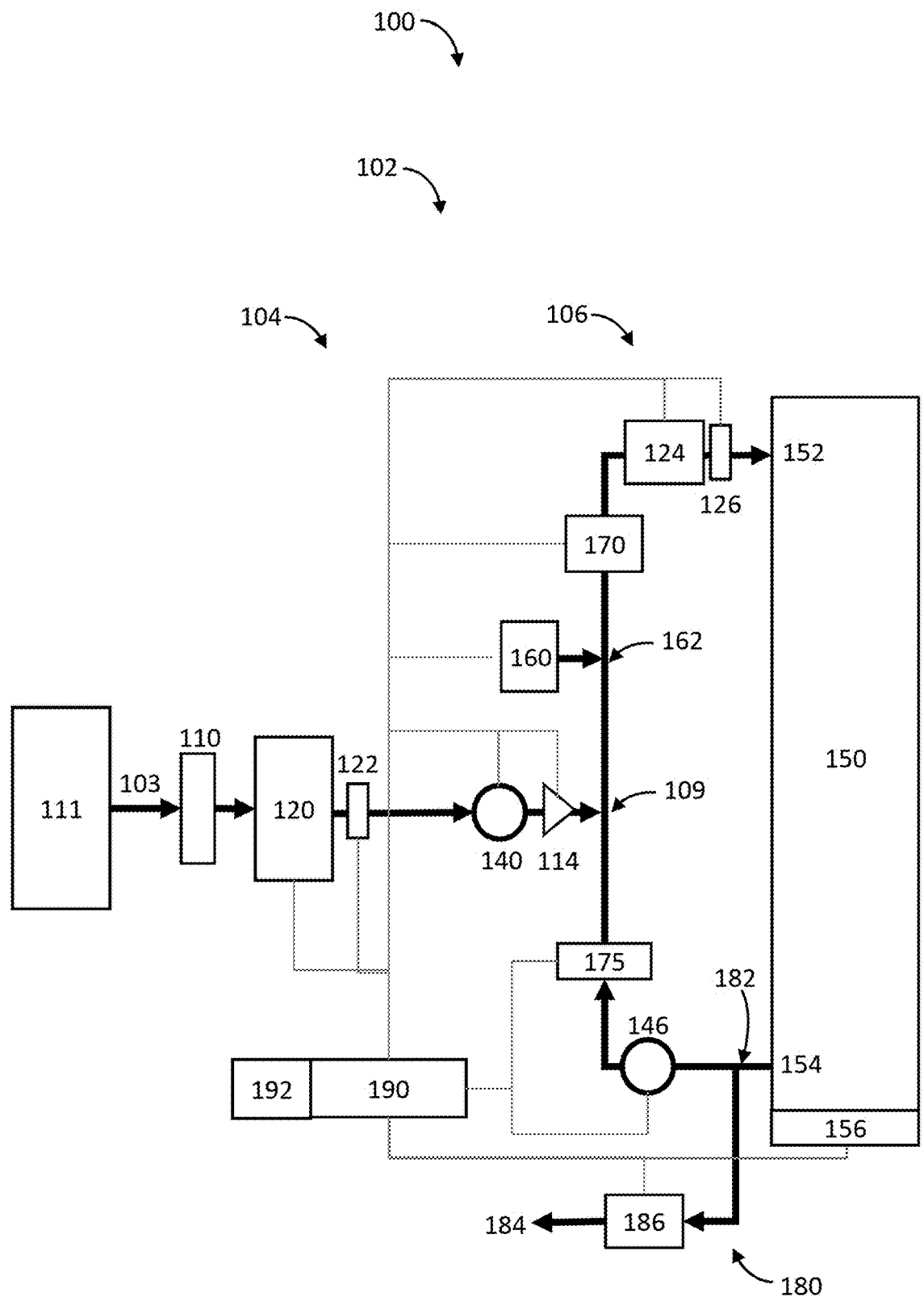
FIG. 2 illustrates a representative block diagram of a water treatment and storage system, according to an exemplary embodiment.

FIG. 2 illustrates a representative block diagram of a water treatment and storage system 100, according to an embodiment. Water management system 100 is merely exemplary and embodiments of the system are not limited to the embodiments presented herein. System 100 can be employed in many different configurations, embodiments or examples not specifically depicted or described herein. In some embodiments, certain elements of system 100 can perform various methods and/or activities of those methods. In these or other embodiments, the methods and/or the activities of the methods can be performed by other suitable elements of system 100.

As explained in greater detail below, in many embodiments, system 100 can make available treated or potable water to a user of system 100. Accordingly, in many embodiments, system 100 can sanitize water made available to a user of system 100, such as, to make the water potable.

In various embodiments, system 100 can generate an oxidizing compound, e.g. ozone, and apply the oxidizing compound to one or more substances, e.g. water. In many embodiments, system 100 can control treatment of the water with ozone, such as, for example, to improve disinfection and storage of the water with the ozone. For example, in some embodiments, system 100 can control a quantity of the ozone generated, when the ozone is generated and/or at which location in system 100 the water is treated with the ozone. The system, for example via a system controller, can adjust one or more oxidizing compound setpoints based on one or more of: a user selection, data received from one or more sensors, programmatic control, and/or by any other desirable bases In some embodiments, system 100 can provide or be associated with other systems providing sanitizing compounds like chlorine or chlorine compounds (e.g., sodium hypochlorite) to water of system 100 to improve disinfection, storage and/or transport of the water. In some implementations, system 100 can be connected to, coupled to or operated with a water distribution system (e.g., building plumbing network, water trucking network and/or the like) and can be configured to receive, treat and/or dispense water based on characteristics of the water distribution system. As an illustrative example, the system can be configured to provide a predetermined residual chlorine level (e.g., between about 0.2 and 0.5 ppm) at consumption points of the distribution network based on distance and/or residence time of water in the distribution network. Furthermore, the system, for example via a system controller, can adjust one or more dosing setpoints of sanitizing compound(s) based on one or more of: a user selection, data received from one or more sensors, programmatic control, and/or by any other desirable bases.

In an embodiment, system 100 is operatively coupled to an external water source or supply system, e.g. water source 111. In some embodiments, system 100 includes a water source or supply system as part of a complete self-contained unit. Water source 111 can be provided as any suitable source of water to be treated by and made available to system 100 for treatment and/or storage. For example, in some embodiments, water source 111 can comprise a public water supply or a water collector (e.g., a rain collector, a fog net, etc.). As another example, water source 111 can comprise trucked water (e.g., chlorinated water delivered via a water trucking or transportation network can be held in a water intake tank before being treated by system 100). In some embodiments, water source 111 can itself comprise or be associated with a filter for removing contaminants from the source water in advance of supplying to system 100. For example, in some embodiments, source water may be processed to remove minerals or other contaminants before input to system 100. In some embodiments, system 100 itself can include one or more pre-processing units, for example to remove minerals or other contaminants. In one example, system 100 can include or be associated with deionization, reverse osmosis (RO) units and/or dechlorinating units.

In various embodiments, system 100 can include a filter unit (e.g., 110) configured to filter water from water source 111 input to water treatment flow path 102 via inlet 103. Filter unit 110 can comprise any suitable material and construction to remove particulate matter, sediments or other contaminants. For example, filter unit 110 can comprise activated carbon, activated alumina, ceramics, porous polymeric membranes, ion exchange membranes and the like. In some embodiments, filter unit 110 can comprise a plurality of filter layers, each having a different material, structure, pore size and/or function. In one example, filter unit 110 comprises a first filter having approximately 20 micron or 40 micron pores for filtering large particulate debris and a second filter having less than about 1 micron, 0.5 micron, less than 0.45 micron, less than 0.35 micron or less than 0.25 micron pore size for filtering bacteria or microbial cysts. In one particular example, larger pore size filters can be provided in advance of smaller por size filters (e.g., a first approximately 20 micron filter followed by an approximately 0.35 micron filter) can be provided in filter unit 110.

In many embodiments, water source 111 can generate the water made available to system 100 for treatment, storage and dispensing of the generated water to an end user. In some of these embodiments, water source 111 can omit a public water supply and/or a conventional water collector (e.g., a rain collector, a fog net, etc.). For example, in some embodiments, water source 111 can comprise a water generating unit configured to generate water. Water source 111 can be provided as an atmospheric water generator or a water-from-air solar panel. In some embodiments, the water source 111 can store firmware that is executed by a microcontroller (e.g., which can be integrated into, or in communication with, the treatment and storage system 100 to perform some or all of the functions associated with the water treatment and storage system 100 described herein.

In one implementation, water source 111 is provided as an atmospheric water generator including a solar thermal panel, a desiccation unit, and a condenser. In one such implementation, water generating unit 111 can cycle a regeneration fluid (e.g., in a closed loop) between the solar thermal panel, the desiccation unit and the condenser to produce water from a process fluid (e.g., air). The condenser of water source 111 can condense water vapor from the regeneration fluid and supply the condensed water to system 100 for treatment and/or storage.

In various embodiments, water source 111 can comprise a plurality of atmospheric water generators configured in an array to direct water generated therein to the storage reservoir via one or more liquid water conduits. For example, the water production system can be implemented as an array of water generation units connected via a system of water conduits in a linear, semi-linear, hub-and-spoke, or "daisy-chain" type of configuration. In one such implementation, water source 111 can cycle a regeneration fluid (e.g., in a closed loop) between the solar thermal panel, the desiccation unit and the condenser to produce water from a process fluid (e.g., ambient air). The condenser of water source 111 can condense water vapor from the regeneration fluid and supply the condensed water to water management system 100 for treatment, storage, customization, and/or dispensing.

As illustrated in FIG. 2, water treatment and storage system 100 includes a water treatment passage or flow path 102 (indicated in thick black arrows) configured to receive water from water source 111 and direct treated water to a storage tank or reservoir 150 of system 100. In one implementation, the water treatment flow path 102 can comprise an inbound or primary water treatment flow path 104 and a recirculation flow path 106 downstream of the primary water treatment flow path 104 in advance of the storage reservoir 150. In the embodiment depicted in FIG. 2, water flowing in primary water treatment flow path 104 is directed to a portion of recirculation flow path 106 at port or valve 109 and then received by storage reservoir 150 via reservoir inlet 152. Storage reservoir 150 may comprise a reservoir outlet 154 configured to output water from the storage reservoir 150 to a dispensing outlet 184 via an outbound or dispensing flow path 180.

Any suitable number or type of pumping devices can be provided to pump water along the water treatment flow path 102 e.g., towards the storage reservoir 150. As depicted in FIG. 2, pumping device 140 is provided along primary water treatment flow path 104 and pumping device 146 is provide along recirculation flow path 106. In other embodiments, a single pumping device can be employed or more than two pumping devices can be employed.

System 100 can include one or more sanitation, disinfection, or oxidation units (e.g., ozone generators, ozone injectors, UV lamps, UV irradiators, chlorinators and/or the like) at one or more locations along the water treatment flow path 102 to expose the water to sanitizing, disinfecting or oxidative conditions (e.g., ozone, UV radiation). As depicted in the embodiment of FIG. 2, inbound or primary oxidation unit 120 (e.g., ozone generator including a venturi or sparger tube) is located along primary water treatment flow path 104 so as to inject an oxidizing agent or compound (e.g., an ionized gas such as but not limited to oxygen or nitrogen and oxygen) into water flowing in the primary water treatment path 104. In an embodiment, ozone unit 120 can comprise an ozone generator and one or more ozone injectors. In some embodiments, ozone unit 120 can include or be operatively coupled to an ozone generator control system, an energy source, a transformer, a blower for inputting feed gas (e.g., air), one or more sensors (e.g. ozone sensors, microbial sensors and/or temperature sensors).

In embodiments, system 100 comprises a secondary or recirculation oxidation unit 124 (e.g., ozone generator) along recirculation flow path 106 to inject an oxidizing agent or compound (e.g., ozone) into water flowing in the recirculation flow path 106. In an embodiment, an inbound or primary oxidation unit can generate or impart a greater amount of oxidizing compound (e.g., ozone) into water compared to other downstream disinfection or oxidation unit(s) of system 100. In some implementations, a single disinfection or oxidation unit can be used to inject ozone to both inbound water and recirculation water. In one example, the amount or rate of ozone injection and/or ozone contact time can be scaled or set as desired for either inbound water or recirculation water. In yet other examples, the system can be configured to inject a set rate of ozone into both inbound and recirculation water.

In some embodiments, a disinfection or oxidation unit (e.g., 120, 124) comprises a disinfection or oxidation controller, for example an ozone generator and an ozone generator controller. Oxidation unit (e.g., 120, 124) can further comprise one or more ozone injectors and one or more ozone sensors. The ozone generator of an oxidation unit (e.g., 120, 124) can generate ozone from a feed gas including oxygen (e.g., air, oxygen concentrator and the like). Accordingly, sanitation, disinfection or oxidation units (e.g., 120, 124) used within exemplary system 100 can comprise any suitable device configured to generate ozone. In some embodiments, an oxidation unit (e.g., 120, 124) can comprise an ultraviolet ozone generator. In other embodiments, oxidation unit (e.g., 120, 124) can comprise a corona ozone generator. For example, in these embodiments, in order to generate ozone, oxidation unit (e.g., 120, 124) can generate an electric field and pass the feed gas through the electric field, thereby causing some diatomic oxygen molecules to dissociate into oxygen atoms that attach to other diatomic oxygen molecules to form ozone. Employing a corona ozone generator may be one approach to generate a significant amount of ozone. Ultraviolet radiation of oxygen or an oxygen containing gas can be used to generate ozone. In embodiments, the concentration of ozone generated by ultraviolet radiation of oxygen or an oxygen containing gas may be below the level of ozone produced by a corona discharge generator.

In many embodiments, system 100 can employ a combination of ozone generation/injection and ultraviolet (UV) radiation to kill any microorganisms present and/or oxidize any undesirable compounds in the source water or that may form during storage. Without being bound by any particular theory, UV radiative oxidation may kill microbes by a DNA/RNA excitation and scission mechanism and/or oxidize organic contaminants in water by generating oxidizing agents such as ozone ($O_3$) or hydrogen peroxide ($H_2O_2$). In the embodiment illustrated in FIG. 2, a UV irradiation unit 170 is configured to expose water in the recirculation flow path 106 to UV radiation in advance of the storage reservoir 150. In embodiments, an outbound UV irradiation unit 186 is provided to expose water in the outbound flow path 180 to UV radiation in advance of dispensing outlet 184.

The embodiment of FIG. 2 depicts a configuration wherein first ozone generator 120 is provided in inbound or primary water treatment flow path 104, second ozone generator 124 and first UV irradiation unit 170 are provided in recirculation flow path 106 and second UV irradiation unit 186 is provided in outbound flow path 180. Other configurations and numbers of disinfection or oxidation units are also possible without departing from the scope of this disclosure.

In one embodiment, when system 100 comprises or is operatively coupled to a water generating unit 111, and when a process fluid (e.g., air) is used by water generating unit 111 includes oxygen, ozone generator of oxidation unit (e.g., 120, 124) can use the process fluid as the feed gas from which oxidation unit (e.g., 120, 124) generates ozone. Using the process fluid as the feed gas can be advantageous because the process fluid can be dehumidified by operation of desiccation unit of water source 111, and dehumidifying the feed gas can be helpful to mitigate or eliminate the formation of nitric acid by oxidation unit (e.g., 120, 124), thereby mitigating corrosion of components in system 100 and/or water source 111. In some embodiments, a dehumidifier component can be associated with or part of an ozone generation unit to prevent nitric acid formation. In various embodiments, the water received by treatment system 100 from water source 111 can have a soft water quality, lacking a user-preferred taste quality, insufficient pH buffering capacity and/or low pH which can be common, for example, if the source water is generated from atmospheric water, a distillation or desalination process, an electrolytic process, an osmotic process, or other processes. Furthermore, water containing certain threshold amounts of additives or minerals, such as calcium and magnesium, can be preferable for consumption by a user (e.g., drinking, cooking, consumption). For potable usage by a user of system 100, it can be desirable to treat the water by adding one or more additives (e.g., "mineralization" by adding minerals to water) and/or addition of pH-buffering salts. In various embodiments, system 100 is configured to mineralize water received from water source 111. System 100 can be configured to introduce and/or maintain one or more additives in the water in treatment flow path 102. In some embodiments, such additives can be configured to dissolve slowly into water flowing in water treatment flow path and/or storage reservoir, for example via water flow through a packed bed of solid minerals. Alternatively, or in addition, such additives can be configured to be injected, for example via a mineral slurry, in or along the treatment flow path 102 (e.g., primary treatment flow path, recirculation flow path 106 or a combination thereof). Furthermore, such additives may be configured to disperse or solvate quickly or alternatively, dissolve slowly into water stored in storage reservoir 150. Additives suitable for use in the present systems include, but are not limited to, minerals, salts, electrolytes, nutrients, pH buffering agents, carbonation agents, other water additive compounds, and/or the like. To illustrate, such additives may be selected from the group comprising: potassium salts, magnesium salts, calcium salts, fluoride salts, carbonate salts, iron salts, chloride salts, sulfate salts, silica, limestone, carbon dioxide generating compounds derivatives and/or combinations thereof. Additional non-limiting examples include: calcium carbonate, calcium chloride, magnesium carbonate, magnesium oxide, magnesium sulfate, dolomitic limestone, calcareous dolomite, dolomite, potassium hydrogen carbonate, potassium bicarbonate, sodium hydrogen carbonate, and derivatives and/or combinations thereof.

In various embodiments, an additive or mineralization unit (e.g., 160) can be configured to inject (e.g., via port or valve 162 into recirculation flow path 106) a mineral slurry comprising magnesium, potassium, sodium, magnesium carbonate, calcium magnesium carbonate, dolomitic limestone, calcareous dolomite, dolomite, magnesium oxide, magnesium sulfate, potassium hydrogen carbonate, sodium hydrogen carbonate, a carbon dioxide generating compound a derivative or a combination thereof.

In the embodiment depicted in FIG. 2, system 100 comprises a mineralization unit 160 configured to introduce one or more minerals into the water flowing in the recirculation flow path 106 of water treatment flow path 102 in advance of the storage reservoir 150. In one example, mineralization unit 160 can be configured to inject magnesium sulfate ($MgSO_4$), calcium chloride ($CaCl_2$)) and potassium bicarbonate ($KHCO_3$) either separately or in combination.

In some embodiments, the water treated by system 100, e.g. dispensed from storage reservoir 150 via dispensing outlet 184, can be similar to "mineral water" i.e. purified water with additive minerals. In some embodiments, the mineralization unit is configured to treat water to less than about 500 ppm total dissolved solids (TDS) content. In other embodiments, the final water has between approximately 50 and 150 ppm of TDS content. In yet other embodiments, the treated water has between approximately 250 ppm and 300 ppm TDS content.

In several embodiments, system 100 can comprise sensor(s) configured to sense water conditions in the water treatment flow path 102 (e.g., primary water treatment flow path 104 and/or recirculation flow path 106), storage reservoir 150 and/or outbound flow path 180. For example, one or more systems associated with system 100 can sense or monitor a water quality parameter, a water flow rate, total water inflow, total water outflow, total amount of water in system at any given time, a water level, a water production rate, a water usage rate, and/or the like. Detection of water conditions by one or more sensors associated with system 100 may occur in real time.

In an embodiment, system 100 can include one or more sensors, either separate or in combination, to detect or measure a quantity or concentration of an oxidizing compound in water. For example, a sensing or measurement device can be provided to measure a quantity or concentration of ozone in water. In various embodiments, the measurement device can be configured to measure pH of the water. In various embodiments, the measurement device can be configured to measure an ion concentration or TDS of water. In one example, the measurement device can be an electrochemical ozone sensor, for example as described in PCT International Application No. PCT/US2019/57492, filed Oct. 22, 2019 entitled "SYSTEMS AND METHODS FOR DETECTING AND MEASURING OXIDIZING COMPOUNDS IN TEST FLUIDS."

System 100 (e.g., via controller 190) can be configured to adjust or maintain sanitation of water of system 100. As an illustrative example, controller 190 can adjust or maintain the quantity of ozone or efficiency of ozone exposure in a water treatment flow path. For example, ozone disinfection efficiency can be measured or set using a CT value or setpoint (ozone concentration multiplied by exposure time). In one example, the controller can adjust an operational setpoint of an oxidation unit based on a temperature dependent CT target setpoint (e.g., greater CT setpoint for higher water temperature). System 100 (e.g., via controller 190) can be configured to maintain a CT value in the range of 0.2 to 5.5 as a function of temperature in the range of 50° C. to 5° C., respectively, such that a 6-log inactivation of giardia cysts is possible. As another example, system 100 (e.g., via controller 190) can be configured to maintain a concentration of ozone above or below a predetermined concentration value (e.g., above 0.1 ppm, below 1 ppm, below 10 ppm, below 100 ppm or other upper or lower limit based on the desired processing time).

The system can be configured to reach any desirable ozone ppm or CT value. In embodiments, the system can be configured to reach a target CT value, for example based on the inbound water flowrate as an input to controller 190. As another example in the case of recirculating water, the system can be configured to target a CT value based on the duration of recirculation operation, which can be determined, such as controller 190, based on water volume in the storage tank and an estimated or assumed degradation rate of ozone (e.g., based on water temperature and/or ambient temperature). In an embodiment, the system can be configured to reach or target a particular CT value (e.g., 2) at intervals throughout the days rather than consistently maintain a particular CT value. In one example, the system can be configured to recirculate water during a morning time duration before inbound water is received (e.g., from solar thermal water production) and then again towards the end of the day, or evening duration, after the majority or all of inbound water has been received for the day.

In various embodiments, system 100 can include pH measurement sensor(s) alone or in combination with other measurement device(s). System 100 (e.g., via controller 190) can be configured to adjust or maintain, for example based on sensed pH measurement(s), a target or predetermined pH parameter for water in the treatment flow path, recirculation flow path and/or storage reservoir. For example a predetermined pH parameter can be between 5.5 to 9, or from 7 to 8.5.

In another example, system 100 can include conductivity or conductance measurement sensor(s). Water conductivity can be a measure of water quality, for example total dissolved solids (TDS) can indicate water purity with respect to additives, minerals, salts, ions, and the like. For example, distilled water or water produced by deionization or reverse osmosis typically has a conductivity of about 2-10 µSiemens. As described in more detail below, system 100 can be configured to produce treated water having a conductivity of greater than about 300 µSiemens or approximately between about 300-600 µSiemens. As another example, system 100 can be configured to produce treated water having a conductivity approximately between 390-500 µSiemens corresponding to approximately between 250 ppm to 300 ppm TDS.

In some embodiments, system 100 can include microbial sensor(s) that can detect and/or measure a concentration of micro-organisms in the treatment path 102. For example, microbial sensor(s) can be detect and/or measure micro-organisms proximal to (e.g., within about 2 meters of, within about 10 meters of, within about 50 or more meters of) or at a location where ozone is generated or injected into water treatment path 102 (e.g., by ozone unit 120, 124). In some embodiments, ozone sensor(s) can comprise any suitable device configured to detect and/or measure a concentration of micro-organisms proximal to (e.g., within about 2 meters of, within about 10 meters of, within about 50 or more meters of) or at a location where ozone is applied to water in water in treatment path 102. For example, in some embodiments, microbial sensor(s) can comprise an impedance sensor. In some embodiments, microbial sensor(s) can be electrically coupled to an ozone generator control system to provide notifications of detected micro-organisms and/or measurements of micro-organism concentration to a controller associated with system 100. In various embodiments, system 100 can include an ozone scheduling system that can cause ozone generator 401 (e.g., 120, 124) to generate ozone as a function of the microorganism concentration and a lethality time. In some embodiments, an ozone scheduling system can receive the micro-organism concentration from microbial sensor(s).

In many embodiments system 100 includes a controller or control unit 190 configured to operate system 100 based on one or more of: a user selection, data received from one or more sensors, programmatic control, and/or by any other suitable bases. In various embodiments, control unit 190 communicates with one or more sensors (e.g., one or more water quality, flow rate, water level sensors) configured to detect water conditions in water treatment system 100. System 100 can be configured to adjust, sense, measure and/or report various water quality parameters including but not limited to: acidity, alkalinity, total hardness, conductivity, calcium concentration, pH, carbon dioxide ($CO_2$) concentration, microbe concentration or presence, total dissolved solids (TDS), turbidity, water temperature, mineral content, oxidizing agent concentration or presence, etc.

Generally, system 100 can be implemented with hardware and/or software, as described herein. In some embodiments, at least part of the hardware and/or software can be conventional, while in these or other embodiments, part or all of the hardware and/or software can be customized (e.g., optimized) for implementing part or all of the functionality of system 100 described herein. In some embodiments, data communicated to a controller (e.g., 190) by one or more peripheral devices (e.g., sensors) may be stored in a data logging unit. In some embodiments, water conditions can be measured in real-time or can be forecast based on, for example, historical averages, weather forecasts and/or the like. In embodiments in which controller 190 receives real-time measurements, various sensors can provide data indicative of water conditions to controller 190 (e.g., continuously, periodically, when requested by controller 190, and/or the like) and in response, controller 190 may be configured to control pumping devices (e.g., 140, 142), disinfection or oxidation units (e.g., 120, 124, 170, 186), additive or mineralization units (e.g. 160), and/or the like. Various examples of controller operation will be described in more detail below.

In some embodiments, system 100 can comprise a telematics unit (e.g., a transmitter, receiver, transponder, transverter, repeater, transceiver, and/or the like, sometimes referred to herein as "transceiver 192"). For example, a transceiver 192 may be configured to communicate data to and/or from the system (e.g., controller 190) via a wired and/or wireless interface (e.g., which may conform to standardized communications protocols, such as, for example, GSM, SMS components operating at relatively low rates (e.g., operating every few minutes), protocols that may be geographically specified, and/or the like). Transceiver 192 may be associated with a server and a communications network for communicating information between the server and the transceiver (e.g., and thus the system and/or a controller 190 thereof). Two-way communication may be facilitated by a cellular tower in cellular range of the system. In some embodiments, a database (e.g., which may be remote from the system) may be configured to store information received from the server over the communications network. In various embodiments, controller 190 in communication with the communications network and a plurality of sensors can be configured to monitor and report the sensed water conditions received from the plurality of sensors. Furthermore, the controller, in response to the sensed water conditions and/or information received via the communications network, can control the operation of the water treatment and storage system 100.

Controller 190 may be configured to maintain or improve water quality and/or sanitation of received or stored water of system 100. In one example, controller 190 maintains water quality and disinfection of stored water by controlling a pump rate and/or flow rate (e.g., via primary treatment or production pump, recirculation pump, dispensing pump, filter flush pump), controlling or activating a water treatment unit (e.g., ozone generator, UV lamp), controlling a valve (e.g., recirculation or dispensing valve) and/or the like, based, on measurements of one or more of inputs or measurements (e.g., such that controller 190 may improve treatment of source water, maintain quality of stored water and dispensing of treated water). As described in more detail below, inputs to controller 190 may be measured in that they are indicated in data captured by one or more sensors.

In an embodiment, controller 190 can control the water treatment system 100 in a plurality of modes. For example, controller 190 can operate system 100 in a primary water treatment mode, for example when source water is present or readily available. In primary water treatment mode, water from water source 111 is directed through the primary water treatment flow path 104 via pump 140 and through valve 109 to a portion of the recirculation flow path 106 in advance of the storage reservoir 150. In this mode, controller 190 can activate primary ozone unit 120 and additive or mineralization unit 160. Optionally, controller 190 can also activate recirculation ozone unit 124 and recirculation UV irradiation unit 170. In one example depicted in FIG. 2, controller 190 can activate or modulate primary ozone generator 120 so as to adjust the quantity or rate of ozone generated based on an ozone quantity or concentration measurement from sensor 122 along water treatment flow path 104 downstream of primary ozone generator 120. In this way, controller 190 can treat source water in advance of storing and/or dispensing to an end user.

In some embodiments, controller 190 can operate system 100 in a recirculation or maintenance mode, for example when recirculation of water stored in storage reservoir 150 is desired or due (e.g., programmatically after a predetermined amount of storage time has lapsed and/or based on a sensed water condition). In a recirculation or maintenance mode, water is directed from the storage reservoir 150 via outlet 154, through the recirculation flow path 106 (e.g., via pumping device 146) and returns to storage reservoir 150 via inlet 152. In this mode, controller 190 can activate recirculation ozone unit 124, mineralization unit 160 and/or recirculation UV irradiation unit 170, for example based on measurements from one or more sensors in recirculation flow path 106. In the example depicted in FIG. 2, sensor unit 175 located downstream of reservoir outlet 154 can measure conductivity (e.g., TDS) and/or pH of the water output from storage reservoir 150 into recirculation flow path 106 and based on these measurement(s), controller 190 can activate or modulate the mineralization unit 170 so as to inject one or more additives into recirculating water to adjust the pH (e.g., raise or stabilize pH via $KHCO_3$) and/or add certain minerals (e.g., $MgSO_4$, $CaCl_2$)) to recirculating water. In this way, controller 190 can maintain quality of stored water.

In another embodiment, controller 190 can operate system 100 in a mixed water treatment mode, for example when source water is present or readily available for treatment and recirculation of water stored in storage reservoir 150 is desired or due (e.g., programmatically and/or based on a sensed water condition). In a mixed water treatment mode, water from water source 111 is directed through the primary water treatment flow path 104 via pumping device 140 and through valve 109 to a portion of the recirculation flow path 106 in advance of the storage reservoir 150. Concurrently, water is directed from the storage reservoir 150 via outlet 154, through the recirculation flow path 106 (e.g., via pumping device 146) to combine with water from primary treatment path 104 at valve 109 and returns to storage reservoir 150 via inlet 152. In this mode, controller 190 can activate primary ozone unit 120, mineralization unit 160, recirculation ozone unit 124 and/or recirculation UV unit 170, for example based on measurements from one or more sensors in primary treatment flow path 104 and/or recirculation flow path 106. In the example depicted in FIG. 2, sensor 122 in water treatment flow path 104 can measure the ozone concentration in the water flowing downstream of the primary ozone generator 120 and sensor 126 in recirculation flow path 106 can measure the ozone concentration in the water flowing downstream of the recirculation ozone generator 124. Based on these measurement(s), controller 190 can activate or modulate the primary and/or recirculation ozone generator(s) 120, 124 to control the amount of ozone entrained in water flow path 102. Additionally, sensor unit 175 located downstream of reservoir outlet 154 can measure conductivity (e.g., TDS) and/or pH of the water output from storage reservoir 150 into recirculation flow path 106 and based on these measurement(s), controller 190 can activate or modulate the mineralization unit 160 so as to inject one or more additives to adjust the pH (e.g., raise or stabilize pH via $KHCO_3$) and/or add certain minerals (e.g., $MgSO_4$, $CaCl_2$)) to water in flow path 102. In this way, controller 190 can treat and maintain quality of stored water.

In various embodiments, one or more flow meters (e.g., 114) can measure the flow rate of water in the treatment flow path 102 and/or outbound flow path 180. Based on flow rate(s) of water in system 100, controller 190 can activate or modulate various components (e.g., activate oxidation unit 120 and/or additive unit 160 when source or inbound water is received), communicate or log water treatment and production data (e.g., revenue grade measurements for billing an end user, water safety measurements for user alerts or maintenance activities), or a combination thereof. In one example, controller 190 can determine if a flow rate of water input to primary water treatment flow path 104 from water source 111 has reached a predetermined threshold. In response, controller 190 can activate primary oxidation unit 120 upon reaching the predetermined threshold of water input from water source 111. Optionally, controller can activate recirculation disinfection unit(s) 124, 170 and/or mineralization unit 160 upon reaching the predetermined threshold of water input from water source 111.

In many embodiments, system 100 can be configured to maintain the quality of water stored in reservoir 150, for example by intermittently treating water stored in reservoir 150 based on sensed conditions, programming and/or user selection. In one example, water storage reservoir 150 can include a water level sensor 156 (e.g., ultrasonic water level sensor) configured to measure the amount of water in storage reservoir 150. Controller 190 can be configured to activate recirculation pumping device 146 to flow water in recirculation flow path 106 at a flow rate based on the water level in storage reservoir 150 so as to treat recirculating water (e.g., via mineralization unit 160, ozone unit 124 and/or UV lamp 170) at a corresponding rate. In yet another example, controller 190 can be configured to activate recirculation pump 146 to flow water from reservoir 150 in recirculation flow path 106 and activate recirculation ozone unit 124 if a predetermined time period has lapsed. For example, the predetermined time period can correspond to a predetermined time in a diurnal cycle (e.g., morning and evening or twice a day corresponding to a 12 hour time lapse). In some embodiments, the controller can be configured to treat water in reservoir 150 via recirculation in response to external conditions (e.g., ambient temperature) or conditions related to peripheral components or units (e.g., rate of source water generation from atmospheric water generator). In one example, the controller can be configured to treat water in reservoir 150 via recirculation during time periods of low source water generation from a solar thermal atmospheric water generator (e.g. early morning and late evening).

In various embodiments, a system controller (e.g., 190) can determine system states and/or water conditions indirectly based on other system states and/or water conditions. As one illustrative example, controller (e.g., 190) can determine the water level of a system water storage reservoir (e.g., 150) by measuring a change in sensed water conductivity, for example subsequent to a quantity of inbound water received and/or subsequent to activation of additive unit (e.g., 160). The water level of the storage reservoir can be a critical system state for determining or adjusting water sanitation and/or additive operations. The system water level state can be input to the controller to determine or adjust the quantity and/or timing of additive addition (e.g., pH adjusting additives), quantity and/or timing of the ozonation, confirmation of available water volume and/or the like.

Additionally, or alternatively, the controller can receive one or more water qualities or conditions as input(s) to determine one or more system states. For example, the controller can use or establish a correlation between water conductivity and water level or volume. For example, the system can sense or measure a water conductivity before and after an injection of additives or minerals of a predetermined quantity, volume and/or concentration. The controller can determine or estimate the total volume of the water in the system based on the change in conductivity as an increase in conductivity will be greater for smaller volumes of water in the system. As another example, the system can sense or measure an ozone concentration before and after an ozonation operation of a predetermined quantity, volume and/or concentration. The controller can determine or estimate the total volume of the water in the system based on the change in sensed ozone as an increase in ozone quantity or concentration will be greater for smaller volumes of water in the system.

Furthermore, a controller (e.g., 190) can be configured to compare sensed or estimated information before, during and/or after a recirculation operation. For example, variations in sensed conductivity can be used to monitor mixing and storage operations. As another example, a controller (e.g., 190) can be configured to compare sensed ozone concentration and/or temperature measurements before, during and/or after a water intake or water recirculation operation to monitor mixing and storage operations, for example by incorporating a predetermined correlation between water temperature and the lifetime of ozone. To illustrate, a controller (e.g., 190) can sense an increase in temperature of water in the storage reservoir to determine recirculated water from the storage reservoir has been replaced by water warmed up in the recirculation flow path. From this determination, the controller can determine the duration required for the temperature change as a function of volume of water in the storage reservoir (and thus the time to recirculate the water). Various approaches can be employed to leverage the interplay of the system sensors to enable a control logic structure that provides the desirable redundancy to keep the system operational and identify failing or miscalibrated system components by running in-situ verification.

As another example, controller 190 can be configured to determine if a concentration of the oxidizing compound (e.g., ozone) in the water output from storage reservoir 150 via outlet 154 is less than a predetermined threshold. In response to determining the concentration of the oxidizing compound in recirculation flow path 106 is less than the predetermined threshold, controller 190 can activate recirculation pumping device 146 and recirculation oxidation unit 124 to recirculate a full or complete storage reservoir volume (e.g., based on measurement by water level sensor 156). In some embodiments, controller 190 can direct at least a portion of water recirculating in recirculation flow path 106 via valve 182.

Figure 3:
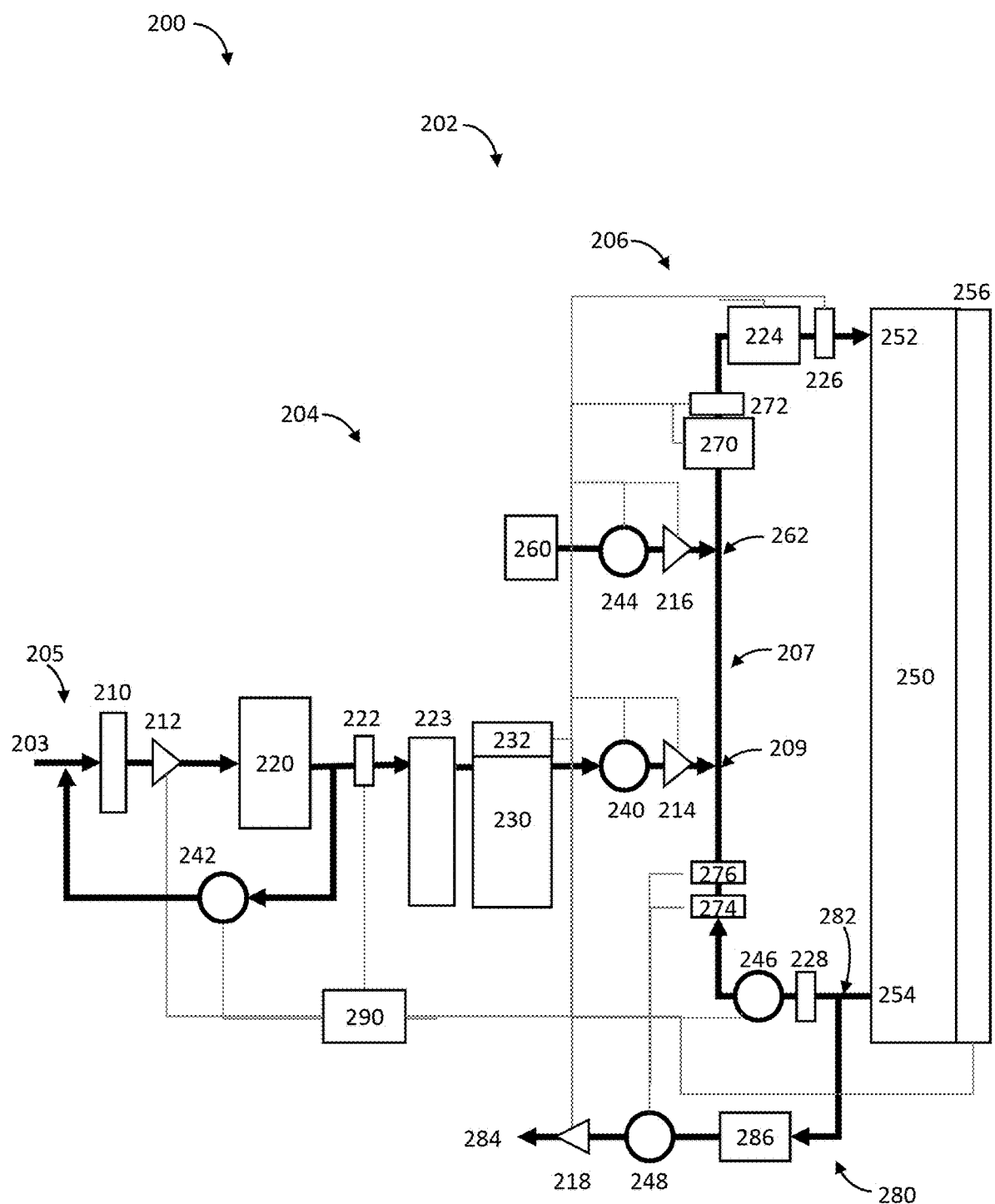
FIG. 3 illustrates a representative block of a water treatment and storage system, according to an exemplary embodiment.

FIG. 3 depicts a water treatment and storage system according to another embodiment. Unless otherwise specified below, the numerical indicators used to refer to the components or features in FIGS. 1 and 2 are similar to those used to refer to components or features in FIG. 3, except that the index has been incremented by 100.

FIG. 3 illustrates a representative block diagram of a water treatment system 200 comprising primary water treatment conduit 205 including an inlet 203 to receive water from a water source and treat the received water in water treatment flow path 202. System 200 includes recirculation conduit 207 including valve 209 to receive water from primary water treatment conduit 205 such that the water treatment flow path 202 includes primary water treatment flow path 204 in advance of a recirculation flow path 206. As depicted in FIG. 3, primary oxidation unit 220 can be configured as an ozone sparger or venturi in combination with a contact tank 223 to improve the disinfection efficiency and/or contact time (e.g., to reach a predetermined CT threshold value) of ozone exposure to water in the primary treatment flow path 204.

In some embodiments, a water treatment system (e.g., 200) can include a production metering unit (e.g., 230) in the primary water treatment path (e.g., 204) for accumulating (i.e. for the purpose of metering) treated or produced water in the water treatment flow path 204 before input to the recirculation and/or storage portion of system 200. In the example depicted in FIG. 3, metering unit 230 is provided downstream of inbound or primary oxidation unit 220 (including contact tank 223). Metering unit 230 can include or be operatively coupled to a water level sensor 232 configured to detect if a water level in the metering unit 230 has reached a predetermined threshold.

In various embodiments, controller 290 is configured to determine if the water level in metering unit 230 has reached a predetermined threshold level (e.g., via level sensor 232). In response to reaching the predetermined water level threshold in metering unit 230, controller 190 can activate production pump 240 to flow water from primary water treatment flow path 204 to a portion of recirculation flow path 206 in advance of storage reservoir 250.

As depicted in FIG. 3, system 200 includes an inbound water flow meter 212 configured to measure the water flow rate in water treatment flow path 204 downstream of filter unit 210. System 200 may comprise a production flow meter 214 configured to measure the water flow rate in treatment flow path 204 downstream of metering unit 230 and in advance of valve 109 and storage reservoir 250. Based on inbound and/or production water flow rates, controller 290 can activate or modulate various components. In one example, controller 290 can activate oxidation unit 220 when the inbound water flow rate (e.g., measured via flow meter 212) is above a predetermined threshold. In another example, controller 290 can activate recirculation oxidation unit(s) 224, 270 and/or mineralization unit 260 (e.g., via pump 244) upon reaching a predetermined threshold of the production water flow rate (e.g., measured via flow meter 214). In embodiments, controller 290 can communicate or log water production data (e.g., revenue grade measurements for billing an end user based on inbound and/or production water flow rates.

The water treatment and storage systems described herein can be deployed as an automated, self-contained and self-sufficient device with regards to fault detection and maintenance. For example, controller 290 can communicate with components of system 200 so as to monitor changing conditions and/or detect faults (e.g., based on sensor measurements). In embodiments, system 200 can be configured to communicate maintenance or fault information over a communications network (e.g., communicate to a user if stored water may be unsafe for consumption based on a sensor measurement or other fault).

In some embodiments water treatment and storage system can be configured for self-maintenance. In the embodiment depicted in FIG. 3, system 200 comprises a filter flush pump 242 configured to recirculate water in the water treatment flow path 204 downstream of the first ozone generator 220 back through the filter unit 210 so as to clean or regenerate filter unit 210. In one example, controller 190 can be configured to activate filter flush pump 242 programmatically (e.g., after a predetermined time period, after a predetermined amount of water has been processed by filter unit 210 and the like).

In an embodiment, water treatment and storage system can have multiple levels or stages of water treatment and sensing to ensure safety and quality of dispensed water for consumption. As depicted in FIG. 3, system 200 comprises an outbound pumping device 248 configured to flow water from storage reservoir 150 (e.g., via inlet 254), through outbound flow path 280 to water dispensing outlet 284. Optionally, the outbound flow path 280 can include an outbound oxidation unit (e.g., outbound UV irradiation unit 286) for additional treatment before dispensing to the end user. In one example, controller 290 can be configured to detect an operational fault of one or more oxidation units (e.g., recirculation ozone generator 224 via ozone sensor 224, recirculation UV generator 270 via UV sensor 272, or outbound UV irradiation unit 286) and in response to detecting the operational fault, the controller 290 can disable the outbound pumping device 248. As another example, the outbound flow path 280 can include an additive unit for water treatment before dispensing to the end user, for example to provide an adjusted mineral taste profile to a user by adding one or more additives into the water in advance of dispensing to a user.

In an embodiment, controller 290 can be configured to determine if a dispensing signal or request (e.g., manually by an end user) and in response, activate dispensing valve 282 and outbound pump 248 to direct water from storage reservoir 250 to outbound flow path 280. In some embodiments, controller 290 can direct at least a portion of water recirculating in recirculation flow path 206 via valve 282. Optionally, controller 290 can activate recirculation pump 246 and recirculation oxidation unit 224 while the dispensing valve 282 is activated. (e.g., via flow meter 218). In embodiments, controller 290 can communicate or log water production data (e.g., revenue grade measurements for billing an end user) based on inbound water flow rate (e.g., via flow meter 212), production water flow rate (e.g., via flow meter 214) and/or outbound water flow rate (e.g., via flow meter 218).

In various embodiments, controller 290 can monitor a plurality of system conditions including water quality, water flow rate, water level, water production rate, water usage rate, and/or the like. In response to sensed conditions of system 200, controller 290 may automatically modify operation to maintain safe treatment, storage and dispensing of treated water. In the example shown in FIG. 3, recirculation flow path 206 can include multiple sensors for water quality measurement. For example, controller 290 can measure ozone concentration of recirculating water exiting storage reservoir 250 (e.g., via ozone sensor 228) and, for example, determine the change in ozone concentration in recirculating water downstream of ozone unit 224 (e.g., via ozone sensor 226) before return to storage reservoir 250. In response, controller 290 can modify the recirculation rate and/or ozone generation rate so as to reach a target CT value in recirculating water, for example.

Figure 4:
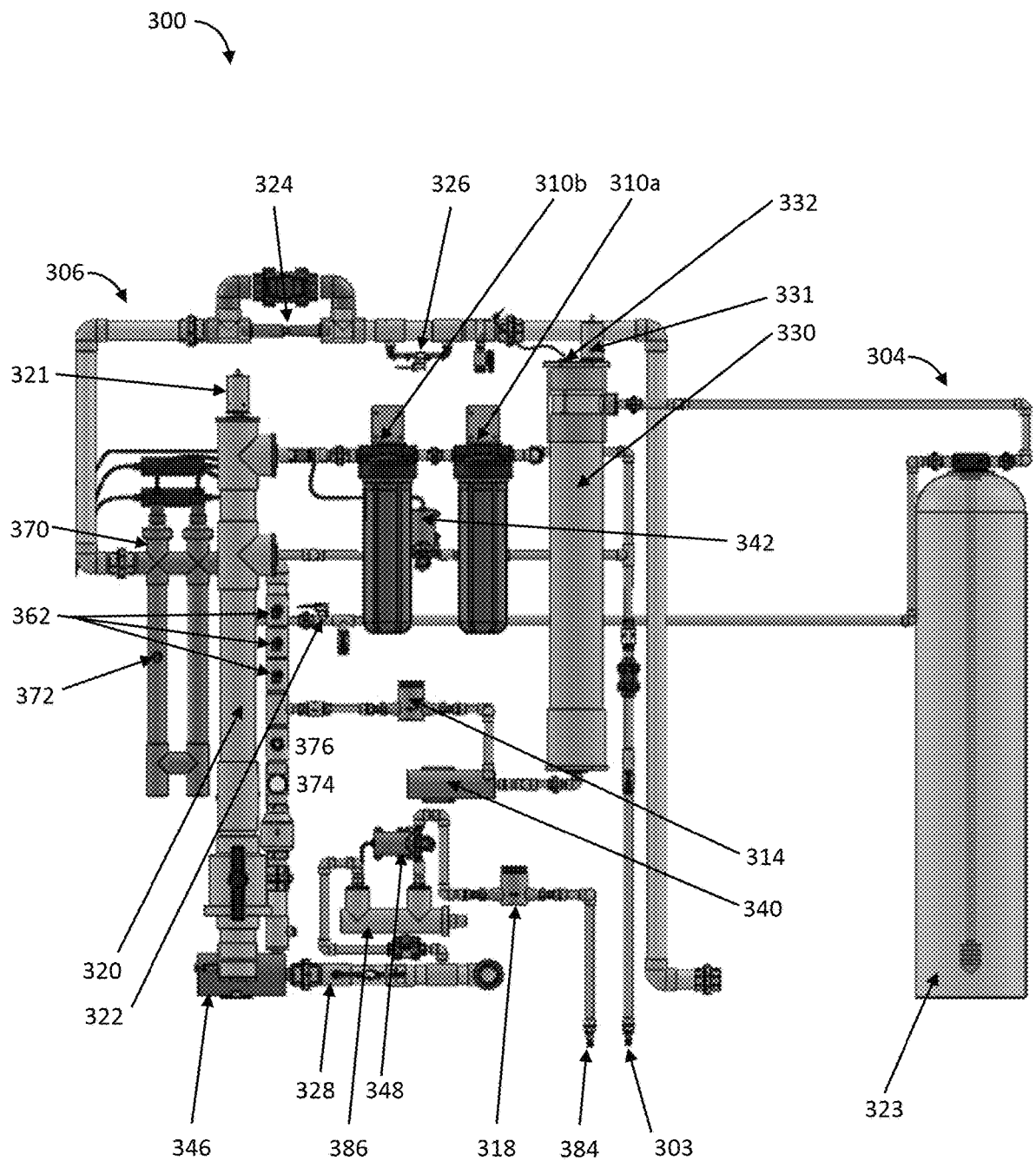
FIG. 4 illustrates a portion of a compact water treatment and storage system, according to an exemplary embodiment.
Figure 5:
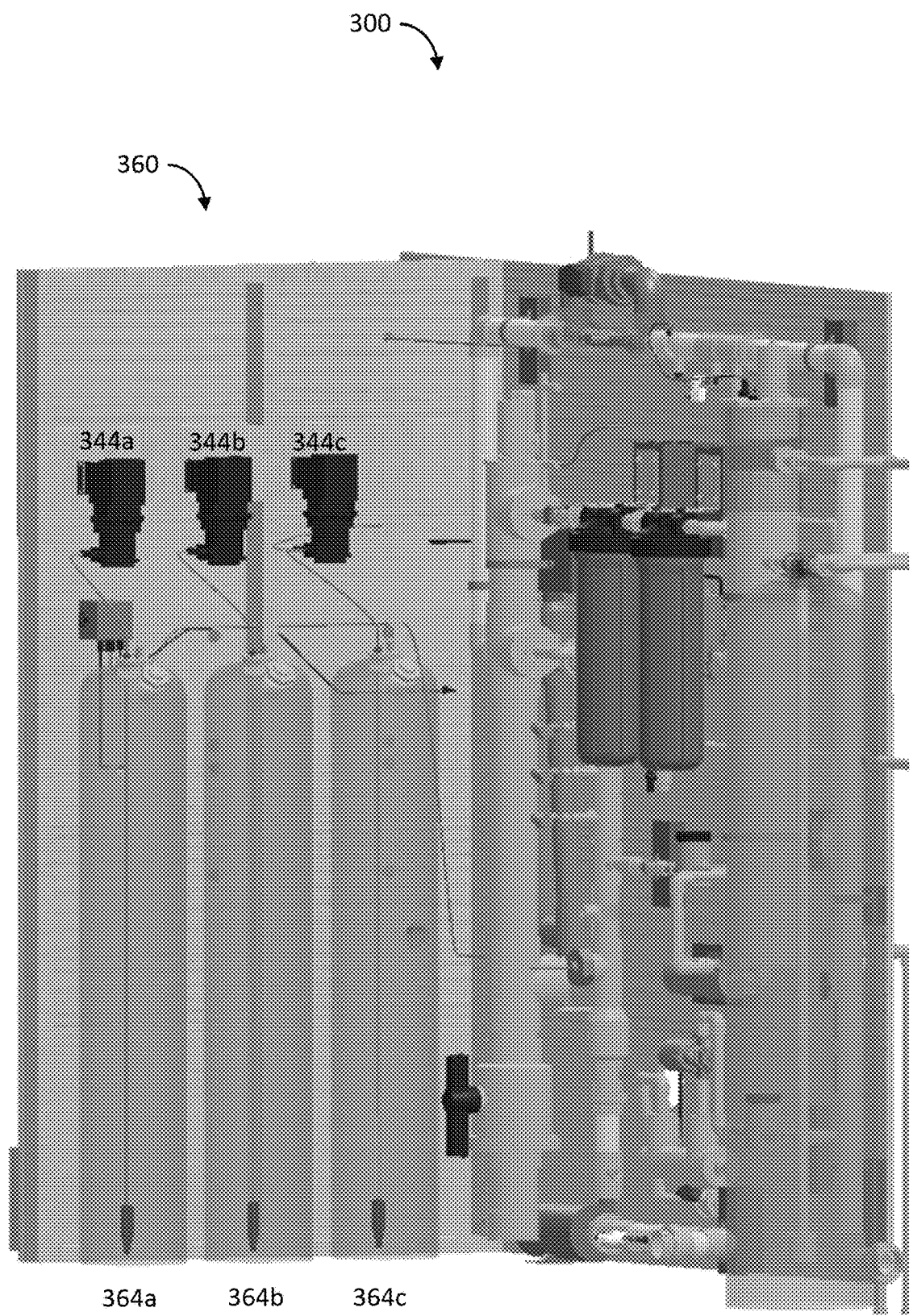
FIG. 5 illustrates a portion of a compact water treatment and storage system, according to an exemplary embodiment.
Figure 6:
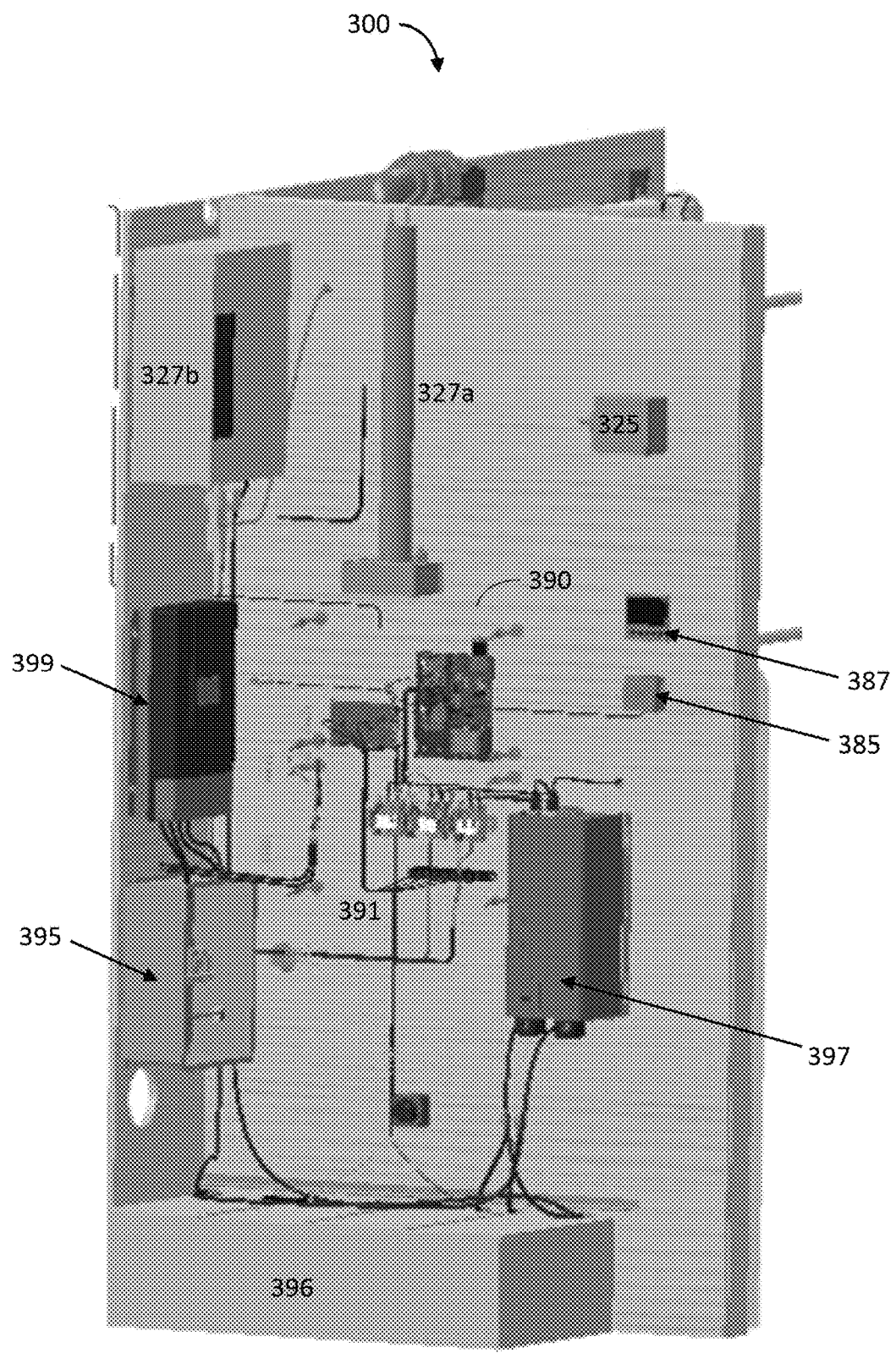
FIG. 6 illustrates a portion of a compact water treatment and storage system, according to an exemplary embodiment.

Water treatment and storage systems described herein can be configured in a compact or space-efficient design to enable deployment in modular or standardized shipping containers. FIG. 4-6 depict a compact water treatment system 300 according to another embodiment. Unless otherwise specified below, the numerical indicators used to refer to the components or features in FIG. 1-3 are similar to those used to refer to components or features in FIG. 4-6, except that the index has been incremented by 100.

As depicted in FIG. 4, system 300 receives source water via inlet 303 and directs received water to a first filter unit 310a (e.g., about 20 micron pore size) and a second filter 310b (e.g., about 0.35 micron pore size). Water is then directed to inbound or primary ozone unit 320 configured as a sparging tube including air vent 321 in combination with contact tank 336 in advance of metering tank 330. Once the water level in metering tank 330 (including air vent 331) has reached a predetermined threshold (e.g., as measured by water level sensor 332), water is directed to recirculation flow path 306 including UV generator 370, UV sensor 372, ozone generator and/or injector 324 and ozone sensor 326. In other implementations, a single ozone generator can be provided as a recirculation pump with a venturi, rather than a sparging tube, to inject ozone. The single ozone generator may provide greater efficiency and control of ozone injection.

In various embodiments, controller (e.g., 190, 290, 390) can determine if a conductivity (e.g., TDS) and/or pH of the water in treatment flow path(s) (e.g., recirculation flow path 106, 206, 306) is below a predetermined threshold. For example, a conductivity sensor (e.g., 175, 274, 374) can measure conductivity (e.g., TDS) of inbound and/or recirculating water. In addition, a pH sensor (e.g., 175, 276, 376) can measure pH of inbound and/or recirculating water. In response to determining the conductivity (e.g., TDS) and/or pH of inbound and/or recirculating water is below a predetermined threshold, controller (e.g., 190, 290, 390) can activate or modulate an additive or mineralization unit (e.g., 160, 260, 360) to inject (e.g., via ports 162, 262, 362) one or more additives, minerals and/or pH-adjusting compounds into water flowing in a water treatment flow path. In an embodiment, a controller (e.g., 190, 290, 390) can activate one or more additive pumping device(s) (e.g., 244, 344a-c) based on sensed water conditions (e.g., TDS, pH). In addition, additive flow rate(s) introduced into treatment flow path(s) (e.g., 206, 306), can be measured, for example via flow meter 216. In some implementations, flowmeter (e.g., 314) can be used to determine the amount or volume of water introduced into the recirculation flow path which can then be used to determine the amount of mineral additive to inject (e.g. amount of magnesium and calcium) and/or the amount of pH-adjusting additive to inject for the determined amount or volume of water.

In one embodiment, mixed or separate slurries of each additive can be injected (e.g., via pump 144, 244, 344a-c) into one or more treatment flow path(s). In the example depicted in FIG. 5, additive or mineralization unit 360 comprises three separate mineral reservoirs or tanks 364a, 364b and 364c operatively coupled to mineral pumps 344a, 344b and 344c (e.g., peristaltic pumps), respectively. Each mineral tank can comprise a unique mineral slurry, for example mineral tank 344a can comprise a magnesium sulfate ($MgSO_4$) slurry, mineral tank 344b can comprise a calcium chloride ($CaCl_2$)) slurry and mineral tank 344c can comprise a potassium bicarbonate ($KHCO_3$) slurry. Controller 390 can activate mineral pumps 344a, 344b and 344c separately or in combination, for example based on or in response to sensed water condition(s) (e.g., low TDS, low pH and the like). In embodiments, controller 390 can adjust an additive injection rate (e.g., via pumps 344a, 344b and/or 344c) on the basis of the difference between a measured parameter and a predetermined parameter value.

Water treatment and management systems of the present disclosure can comprise any desirable number or type of water quality adjustment or additive units for customizing, adjusting or modifying the quality of water produced or provided by water supply system 111. In one example, an additive or mineralization unit can add, dissolve or inject additives, agents or other components into water of the storage reservoir in advance of dispensing to a user and/or in a recirculating manner. In some embodiments, mineralization or additive unit(s) can add additives, agents or components into generated water in various ways and under various operation conditions. That is, a combination of automatic, programmatic and/or on-demand approaches can be applied to adjust inbound water and/or recirculating water based on the desired operational approach.

System 100 can comprise any number or configurations of additive vessels, reservoirs or cartridges, for example each comprising a unique additive or combination of additives in liquid, solution, slurry, solid or particulate form configured to be added, injected or dissolve into water upon flowing therethrough. Water additive unit (e.g., 160) can include a one or more proportional valves (e.g., solenoid valves) and/or pumps (e.g., peristaltic pumps), associated with one or more additive cartridges, reservoirs or vessels to proportion water flow therethrough or nearby. In some embodiments, additive unit(s) can comprise mixing units, valves, devices or assemblies.

Mineralization or additive units of the present disclosure can comprise one or more receptacles or mountings capable of receiving or mounting to a respective additive vessel, cartridge, package or other additive supply. In one example, an additive package or cartridge can be manufactured as a packed bed of mineral particulate material secured in a rigid plastic container allowing facile insertion and replacement into a compatible receptacle (e.g. push connections and/or the like). As another example, an additive reservoir can be configured as a liquid mineral slurry secured in a container pouch or vessel allowing replaceability or refilling. When inserted into the associated receptacle or mounting at least one associated fitting can allow water to flow through the contents or allow the contents to be pumped or otherwise directed or metered by controller.

In some embodiments, water produced by a water production or supply system (e.g., 111) can be treated, adjusted or mineralized in advance of a system additive unit (e.g., 160), for example to establish a baseline or balanced water profile having sufficient minerals for dispensing to a user as drinking water. In some implementations, system 100 can include an inbound mineralization or additive unit configured to impart additives into received water from water source 111. In another example, the storage reservoir 150 comprises a submerged additive pouch or packet configured to slowly dissolve an additive into water stored in the storage reservoir. As such, a dispensed water profile can range between a baseline water profile (e.g., based on an inbound additive unit and/or submerged packet in reservoir 150) and an adjusted water profile (e.g. from recirculating water to receive additives from additive unit 160). A system controller can adjust, based on a user input and/or an operational setpoint of the system.

As depicted in FIG. 5, system 300 comprises a control unit 390 including a control circuit and sensor board operatively coupled to relays and current sensors 391. In embodiments, system 300 comprises a dispensing switch 385 in communication with controller 390 for a dispensing signal or request (e.g., manually by an end user). One or more displays can be provided to communication an operational mode or water condition (e.g., TDS display 387). In an embodiment, an inbound water ozone pump 325 and peripheral ozone units (e.g., peripheral inbound water ozone unit 327*a*, peripheral recirculation ozone unit 327*b*, or a single ozone generator) can be included. In some implementations, a single ozone generator can be provided and configured to serve multiple injection points (e.g. both inbound water and recirculating water injection locations), and/or can be used to reduce system cost, complexity and in some cases provide an opportunity for passive control in operations modes where inbound water flow and recirculation operations are not run simultaneously.

In an embodiment, water treatment and storage system comprises peripheral components, to facilitate self-sufficient, compact and/or self-contained deployment. For example, system 300 can comprise an onboard energy generation and/or energy storage system. For example system (e.g., 100, 200, 300) can comprise or be associated with peripheral or support components including photovoltaic panels (e.g., panel 98 shown in FIG. 1), maximum power point (MPPT) controller (e.g., 399), a power optimizer or converter (e.g., inverter 397), a battery unit or pack (e.g., 396), electrical interconnects or components (e.g., combiner box 395).

Figure 7:
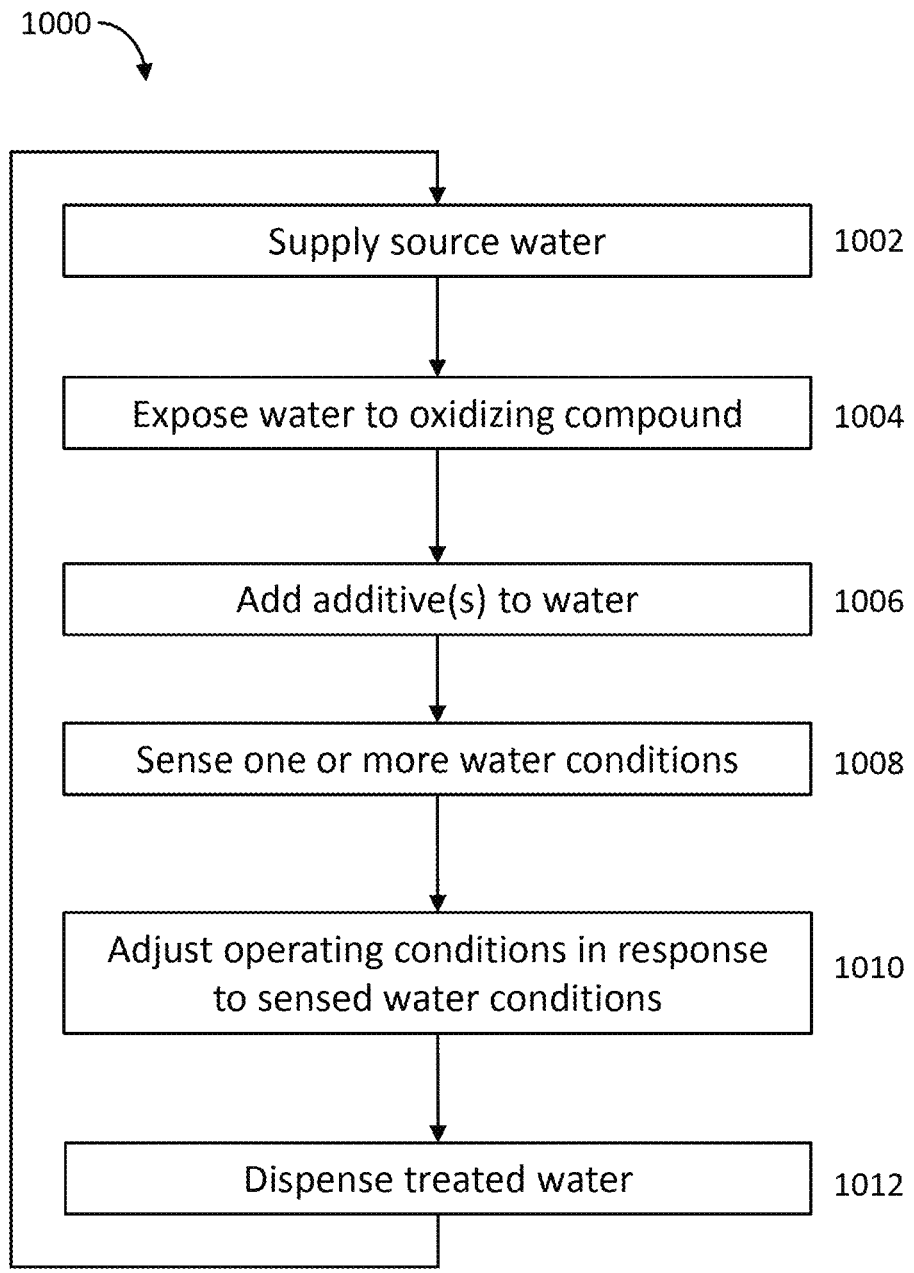
FIG. 7 illustrates a flow chart outlining a method of operating a water treatment and storage system, according to an exemplary embodiment.

The system 100 can be configured to withstand and survive extreme external environmental conditions (e.g., high or low ambient temperatures), for example via operating the system in a hibernation mode and/or features to minimize or mediate failures due to extreme environmental conditions. In some embodiments, a disinfection, sanitation or oxidation unit of water management system can generate gases in the operation of the system, for example ozone to sanitize water, that may need to be safely exhausted, or otherwise moderated or remediated. As such, system 100 can include one or more features to facilitate expansion, contraction, ventilation, survival of extreme environmental conditions, and/or other type of mediation. In one example, system 100 can include one or more exhausts, vents or auxiliary outlets to vent gases contained in system 100 and/or to provide a conduit for water overflow (e.g. during expansion as a result of a freezing event or condition) or a combination thereof. In another example, a vent or auxiliary outlet can include a moderating material or filter (e.g., a carbon disproportionation frit configured to scrub any ozone exhaust). For example, a hydrophobic filter membrane can be provided, for example situated at a T-valve or joint in a vent or overflow line to allow for dedicated gas venting when the vent or overflow line is frozen. The present disclosure further provides methods or processes for a water treatment and/or storage system. FIG. 7 illustrates a flow chart 1000 of a non-limiting example of a method of operating a water treatment and storage system as described herein. In various embodiments, the method of operating a water treatment and storage system (e.g., 100, 200, 300) comprises supplying source water to the water treatment and storage system at operation 1002. In one particular example, water can be supplied to water treatment and storage system via an atmospheric water generator (e.g., solar thermal water-from-air system).

At operation 1004, the method of operating water treatment system (e.g., 100, 200, 300) comprises exposing the water to an oxidizing agent or compound. At operation 1004, exposing the water to an oxidizing agent in the water treatment flow path can include exposing the water in the water treatment flow path to a combination of ozone and UV radiation at different locations along the water treatment flow path. For example, the method can include exposing water in a primary treatment flow path to ozone and water in a recirculation flow path to UV radiation.

At operation 1006, the method of operating water treatment system (e.g., 100, 200, 300) comprises injecting additives or minerals into the water in the water treatment flow path. For example, operation 1006 can include injecting a calcium compound, a magnesium compound, a pH-adjusting agent individually or in combination (e.g., at different times and/or in different amounts based on sensed water conditions).

At operation 1008, the method of operating water treatment system (e.g., 100, 200, 300) comprises sensing, by one or more sensors, a plurality of water conditions in the water treatment flow path. Various water conditions can be measured including a water quality parameter, a water flow rate, a water level or a combination thereof. In various embodiments operation 1008 can include sensing water acidity, alkalinity, total hardness, conductivity, calcium concentration, pH, microbe concentration, $CO_2$ concentration, total dissolved solids (TDS), turbidity, oxidizing agent(s) or a combination thereof.

At operation 1010, the method of operating water treatment system (e.g., 100, 200, 300) comprises adjusting the operating conditions of the water treatment system in response to sensed water conditions to maintain water quality of the treated water. In one example, operation 1010 can include determining, based on the sensed water conditions, the quantity of the oxidizing agent (e.g., ozone) in water flowing in the water treatment flow path; and, adjusting the a time of exposure of the water to the oxidizing agent based on the quantity of the oxidizing agent in water flowing in the water treatment flow path. In some embodiments, the method comprises determining if an ozone CT value in the primary water treatment flow path is above a predetermined value (e.g., 2); and, in response to determining the ozone CT value in the primary water treatment flow path is above 2, distribute (e.g., via metering unit) water from the primary treatment flow path to at least a portion of the recirculation flow path in advance of the storage reservoir.

In various embodiments, adjusting the operating conditions of the water treatment system can include recirculating water from the storage reservoir into a recirculation flow path and back to the storage reservoir, for example based on a lapsed time and/or a sensed water condition. As another example, adjusting the operating conditions can include determining the flow rate of water input to the primary water treatment flow path from the water source is above a predetermined threshold and, activating the primary oxidation unit if the flow rate of water input from the water source is above the predetermined threshold.

In various embodiments, the method can include adjusting the operating condition can include determining if a water condition (e.g., TDS, pH) in water in the recirculation flow path is below a predetermined threshold; and, in response to determining the sensed water condition (e.g., TDS, pH) is below the predetermined threshold, activate the mineralization unit to inject one or more mineral or pH-adjusting compounds into the water flowing in the recirculation flow path.

In some embodiments, operation 1010 can include determining a water level in the storage reservoir and activating a recirculation pumping device to flow water along the recirculation flow path at a flow rate based on the water level in the storage reservoir. As another example, operation 1010 can include determining if a predetermined time period has lapsed and activating a recirculation pumping device to flow water along the recirculation flow path if the predetermined time period has lapsed. Optionally, the method can include activating a recirculation disinfection or oxidation unit to generate disinfecting or oxidative conditions in water flowing in the recirculation flow path if the predetermined time period has lapsed.

At operation 1012, the method of operating water treatment system (e.g., 100, 200, 300) can comprise dispensing water from the storage reservoir of the water treatment and storage system. For example, the method can comprise receiving a dispensing signal in response, activating the dispensing valve and outbound pumping device to direct water from the storage reservoir to the outbound flow path.

Figure 8:
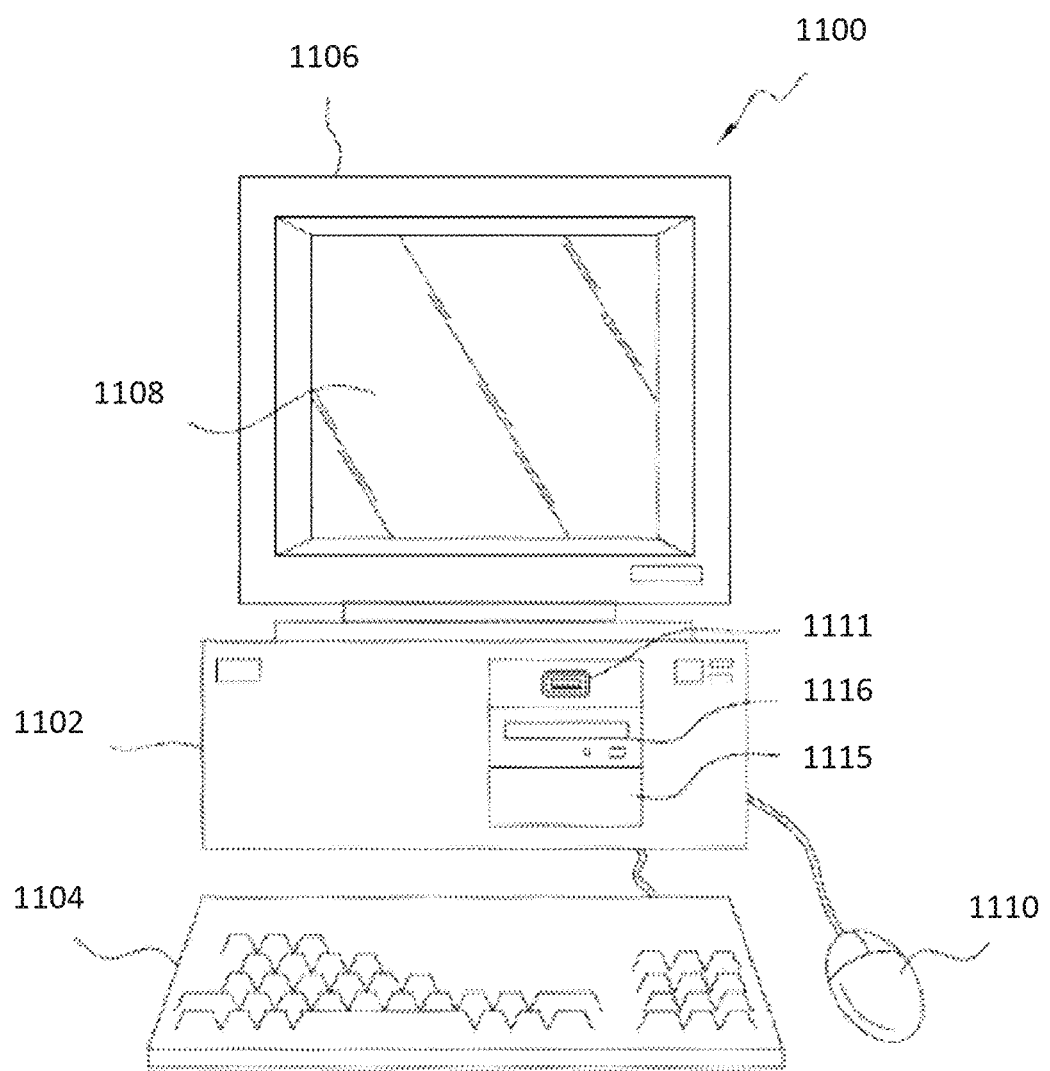
FIG. 8 illustrates a front elevational view of an exemplary computer system that is suitable to implement at least part of a water treatment and storage control system described herein, and/or to implement one or more of the methods described herein, according to an exemplary embodiment.
Figure 9:
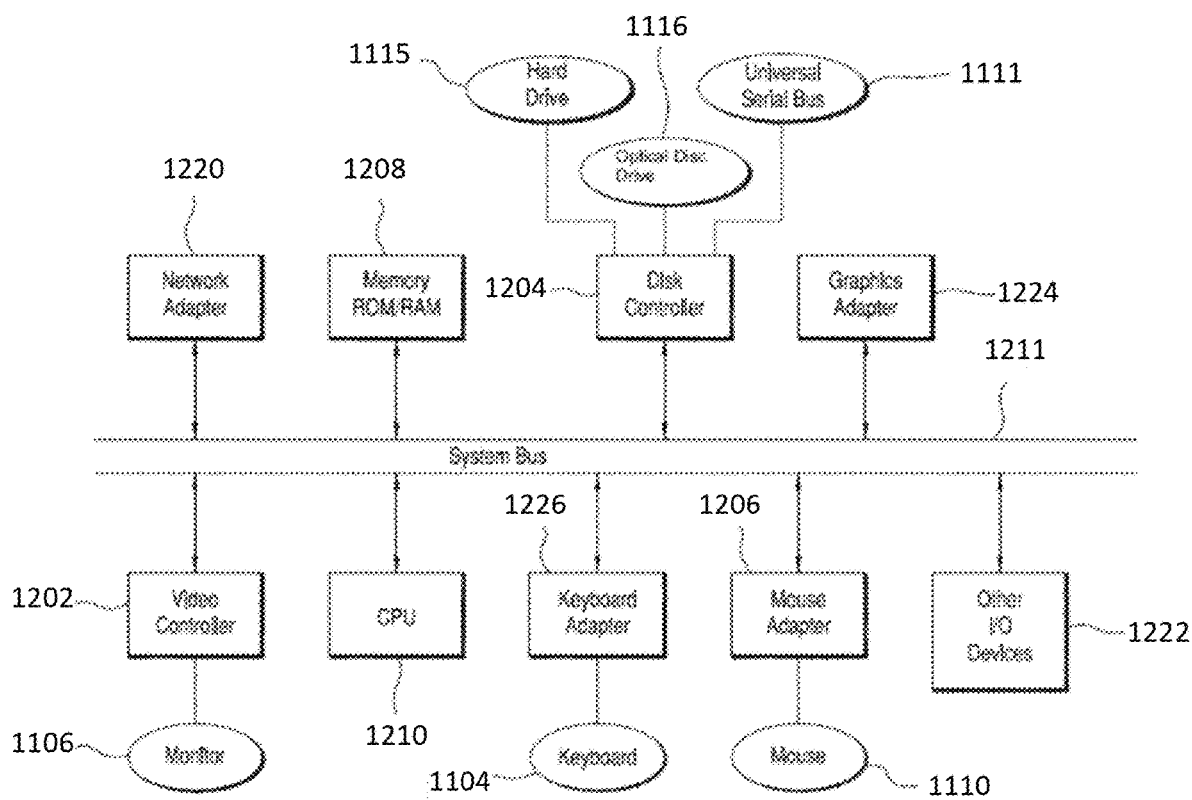
FIG. 9 illustrates a representative block diagram of exemplary elements included on the circuit boards inside a chassis of the exemplary computer system of FIG. 8, according to an exemplary embodiment.

FIGS. 8 and 9 illustrate exemplary embodiments of a computer system 1100, all of which or a portion of which can be suitable for (i) implementing part or all of one or more embodiments of the techniques, methods, and systems and/or (ii) implementing and/or operating part or all of one or more embodiments of the memory storage devices described herein.

For example, in some embodiments, all or a portion of computer system 1100 can be suitable for implementing part or all of one or more embodiments of the techniques, methods, and/or systems described herein. In various embodiments, a farm control system comprises computer system 1100. In various embodiments, water treatment and storage control system (e.g., 190, 290, 390) comprises computer system 1100. In embodiments, one or more elements of computer system 1100 (e.g., a refreshing monitor 1106, a keyboard 1104, and/or a mouse 1110, etc.) also can be used for implementing part or all of one or more embodiments of the techniques, methods, and/or systems described herein.

In many embodiments, computer system 1100 can comprise chassis 1102 containing one or more circuit boards (not shown), a Universal Serial Bus (USB) port 1111, a hard drive 1115, and an optical disc drive 1116. Meanwhile, for example, optical disc drive 1116 can comprise a Compact Disc Read-Only Memory (CD-ROM), a Digital Video Disc (DVD) drive, or a Blu-ray drive. Still, in other embodiments, a different or separate one of a chassis 1102 (and its internal components) can be suitable for implementing part or all of one or more embodiments of the techniques, methods, and/or systems described herein.

In various embodiments, computer system 1100 is configured to receive data from one or more sensors of water treatment and storage system (e.g., 100, 200, 300), calculate a value from the received data, compare the value to a predetermined threshold, and control a component of water treatment and storage system (e.g., 100, 200, 300) in response to the comparison.

Turning ahead in the drawings, FIG. 9 illustrates a representative block diagram of exemplary elements included on the circuit boards inside chassis 1102 (FIG. 8). For example, a central processing unit (CPU) 1210 is coupled to a system bus 1211. In various embodiments, the architecture of CPU 1210 can be compliant with any of a variety of commercially distributed architecture families.

In many embodiments, system bus 1211 also is coupled to a memory storage unit 1208, where memory storage unit 1208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 1208 can comprise (i) non-transitory memory and/or (ii) transitory memory.

The memory storage device(s) of the various embodiments disclosed herein can comprise memory storage unit 1208, an external memory storage drive (not shown), such as, for example, a USB-equipped electronic memory storage drive coupled to universal serial bus (USB) port 1111 (FIGS. 8 & 9), hard drive 1115 (FIGS. 8 & 9), optical disc drive 1116 (FIGS. 8 & 9), a floppy disk drive (not shown), etc. As used herein, non-volatile and/or non-transitory memory storage device(s) refer to the portions of the memory storage device(s) that are non-volatile and/or non-transitory memory.

In various examples, portions of the memory storage device(s) of the various embodiments disclosed herein (e.g., portions of the non-volatile memory storage device(s)) can be encoded with a boot code sequence suitable for restoring computer system 1100 (FIG. 8) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 1100 (FIG. 8). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) iOS™ by Apple Inc. of Cupertino, Calif., United States of America, (ii) the Blackberry® OS by Research In Motion (RIM) of Waterloo, Ontario, Canada, (iii) the Android™ OS developed by the Open Handset Alliance, or (iv) the Windows Mobile™ OS by Microsoft Corp. of Redmond, Wash., United States of America. Further, as used herein, the term "computer network" can refer to a collection of computers and devices interconnected by communications channels that facilitate communications among users and allow users to share resources (e.g., an internet connection, an Ethernet connection, etc.). The computers and devices can be interconnected according to any conventional network topology (e.g., bus, star, tree, linear, ring, mesh, etc.).

As used herein, the term "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 1210.

In the depicted embodiment of FIG. 9, various I/O devices such as a disk controller 1204, a graphics adapter 1224, a video controller 1202, a keyboard adapter 1226, a mouse adapter 1206, a network adapter 1220, and other I/O devices 1222 can be coupled to system bus 1211. Keyboard adapter 1226 and mouse adapter 1206 are coupled to keyboard 1104 (FIGS. 8 & 9) and mouse 1110 (FIGS. 8 & 9), respectively, of computer system 1100 (FIG. 8). While graphics adapter 1224 and video controller 1202 are indicated as distinct units in FIG. 9, video controller 1202 can be integrated into graphics adapter 1224, or vice versa in other embodiments. Video controller 1202 can be suitable for refreshing monitor 1106 (FIGS. 8 & 9) to display images on a screen 1108 (FIG. 8) of computer system 300 (FIG. 8). Disk controller 1204 can control hard drive 1115 (FIGS. 8 & 9), USB port 1111 (FIGS. 8 & 9), and optical disc drive 1116 (FIGS. 8 & 9). In other embodiments, distinct units can be used to control each of these devices separately.

Network adapter 1220 can be suitable to connect computer system 1100 (FIG. 8) to a computer network by wired communication (e.g., a wired network adapter) and/or wireless communication (e.g., a wireless network adapter). In some embodiments, network adapter 1220 can be plugged or coupled to an expansion port (not shown) in computer system 1100 (FIG. 8). In other embodiments, network adapter 1220 can be built into computer system 1100 (FIG. 8). For example, network adapter 1220 can be built into computer system 1100 (FIG. 8) by being integrated into the motherboard chipset (not shown), or implemented via one or more dedicated communication chips (not shown), connected through a PCI (peripheral component interconnector) or a PCI express bus of computer system 1100 or USB port 1111.

Returning now to FIG. 8, although many other components of computer system 1100 are not shown, such components and their interconnection are well known to those of ordinary skill in the art. Accordingly, further details concerning the construction and composition of computer system 1100 and the circuit boards inside chassis 1102 are not discussed herein.

Meanwhile, when computer system 1100 is running, program instructions (e.g., computer instructions) stored on one or more of the memory storage device(s) of the various embodiments disclosed herein can be executed by CPU 1210 (FIG. 9). At least a portion of the program instructions, stored on these devices, can be suitable for carrying out at least part of the techniques, methods, and activities of the methods described herein. In various embodiments, computer system 1100 can be reprogrammed with one or more systems, applications, and/or databases to convert computer system 1100 from a general purpose computer to a special purpose computer.

Further, although computer system 1100 is illustrated as a desktop computer in FIG. 8, computer system 1100 can have a different form factor while still having functional elements similar to those described for computer system 1100. In some embodiments, computer system 1100 may comprise a single computer, a single server, or a cluster or collection of computers or servers, or a cloud of computers or servers. Typically, a cluster or collection of servers can be used when the demand on computer system 1100 exceeds the reasonable capability of a single server or computer. In certain embodiments, computer system 1100 may comprise an embedded system.

The above specification and examples provide a description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include modifications and alternatives falling within the scope of the claims, and embodiments other than the one shown may include some or all of the features of the depicted embodiment. For example, elements may be omitted or combined as a unitary structure, and/or connections may be substituted. Further, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively. The term "substantially," as used herein, is intended to encompass minor deviations rather define an exact value.

What is claimed is:

1. A water treatment and storage system comprising:
    a water treatment flow path including a primary water treatment flow path to receive water from a water source and direct the water in a recirculation flow path to a storage reservoir;
    one or more pumping devices to flow the water along the water treatment flow path to the storage reservoir;
    a first oxidation unit to inject an oxidizing compound into the water flowing in the primary water treatment flow path;
    an additive unit for adding one or more additives into the water flowing in the water treatment flow path in advance of the storage reservoir;
    an outbound flow path to receive the water from a reservoir outlet of the storage reservoir and direct the water to a dispensing outlet; and
    a controller to control an operation of the water treatment and storage system in a plurality of modes including:
        a primary water treatment mode wherein the water is directed through the primary water treatment flow path and a through portion of the recirculation flow path in advance of the storage reservoir;
        a recirculation maintenance mode wherein the water is directed from the storage reservoir, through the recirculation flow path and back to the storage reservoir; and, a mixed water treatment mode wherein the water is directed through the primary water treatment flow path to a portion of the recirculation flow path in advance of the storage reservoir, and wherein the water is directed from the storage reservoir through the recirculation flow path;

wherein the oxidizing compound is ozone, wherein the controller is configured to maintain at least one of:
- an ozone CT value in a first range of 0.2 to 5.5 as a function of temperature in a second range of 50 degrees Celsius to 5 degrees Celsius; and
- a concentration of ozone above a concentration value of 0.25 ppm in the water treatment flow path.

2. The water treatment and storage system of claim 1, wherein the water source is an atmospheric water generator; and, wherein the controller is configured to:
- determine if a production water flow rate input to the primary water treatment flow path from the water source is above a predetermined threshold; and
- activate the first oxidation unit if the production water flow rate input from the water source is above the predetermined threshold; and,
- communicate or log water production data of the atmospheric water generator based on the production water flow rate input.

3. The water treatment and storage system of claim 1,
- wherein the water treatment and storage system further comprises at least one recirculation oxidation unit to generate oxidative conditions in the water flowing in the recirculation flow path; and,
- wherein the additive unit adds the one or more additives into the water flowing in the recirculation flow path in advance of the storage reservoir.

4. The water treatment and storage system of claim 3, wherein the at least one recirculation oxidation unit comprises at least one of:
- a recirculation ozone injection unit to inject ozone into the water flowing in the recirculation flow path; and
- an ultraviolet (UV) irradiation unit for irradiating the water in the recirculation flow path.

5. The water treatment and storage system of claim 1, wherein the controller is configured to:
- determine if a flow rate of water input to the water treatment flow path from the water source is above a predetermined threshold; and
- activate a recirculation oxidation unit if the flow rate of water input from the water source is above the predetermined threshold.

6. The water treatment and storage system of claim 1, wherein the water treatment and storage system comprises a metering unit in the primary water treatment flow path downstream of the first oxidation unit;
- wherein the controller is configured to determine if a water level in the metering unit has reached a predetermined threshold; and
- in response to reaching the predetermined water level threshold in the metering unit, activate a production pumping device to flow the water from the primary water treatment flow path to the recirculation flow path in advance of the storage reservoir.

7. The water treatment and storage system of claim 1, wherein the controller is configured to:
- determine if a conductivity of the water in the recirculation flow path is below a predetermined threshold; and
- in response to determining the conductivity of the water in the recirculation flow path is below the predetermined threshold, activate the additive unit to add the one or more additives into the water flowing in the recirculation flow path.

8. The water treatment and storage system of claim 3, wherein the controller is configured to:
- determine if a pH value of the water in the recirculation flow path is below a predetermined threshold; and
- in response to determining the pH value of the water in the recirculation flow path is below the predetermined threshold, activate the additive unit to add one or more pH adjusting compounds into the water flowing in the recirculation flow path.

9. The water treatment and storage system of claim 3, wherein the controller is configured to:
- determine a water level in the storage reservoir; and
- activate a recirculation pumping device to flow the water along the recirculation flow path at a flow rate based on the water level in the storage reservoir.

10. The water treatment and storage system of claim 3, wherein the controller is configured to:
- determine if a predetermined time period has lapsed;
- activate a recirculation pumping device to flow the water along the recirculation flow path if the predetermined time period has lapsed; and
- activate the at least one recirculation oxidation unit to generate the oxidative conditions in the water flowing in the recirculation flow path if the predetermined time period has lapsed.

11. The water treatment and storage system of claim 1, wherein the controller is configured to:
- determine, based on one or more sensed water conditions from the one or more sensors, a quantity of the oxidizing compound in the water flowing in the water treatment flow path; and
- adjust the quantity of the oxidizing compound generated by the first oxidation unit based on the quantity of the oxidizing compound in the water flowing in the water treatment flow path.

12. The water treatment and storage system of claim 1, wherein the water treatment and storage system comprises:
- an outbound pumping device to flow the water from the storage reservoir, through the outbound flow path to the dispensing outlet; and,
- an outbound disinfection unit to disinfect the water flowing in the outbound flow path;

wherein the controller is configured to:
- detect an operational fault of at least one of the first oxidation unit, a recirculation oxidation unit and the outbound disinfection unit; and
- in response to detecting the operational fault, disable the outbound pumping device.

13. The water treatment and storage system of claim 1, wherein the controller is configured to:
- receive a dispensing signal; and
- in response to receiving the dispensing signal, activate a dispensing valve and an outbound pumping device to direct the water from the storage reservoir to the outbound flow path.

14. The water treatment and storage system of claim 13, wherein the controller is configured to:
- activate a recirculation pumping device and a recirculation oxidation unit; and
- direct at least a portion of the water in the recirculation flow path to the outbound flow path via the dispensing valve.

15. The water treatment and storage system of claim 1, wherein:
the water treatment and storage system comprises a filter unit to filter the water from the water source in advance of the first oxidation unit; and
the controller is configured to activate a filter flush pump to recirculate the water in the water treatment flow path downstream of the first oxidation unit and back through the filter unit.

16. The water treatment and storage system of claim 1, wherein the controller is configured to:
determine if a concentration of the oxidizing compound in the water that is output from the storage reservoir through the recirculation flow path is less than a predetermined threshold; and
in response to determining the concentration of the oxidizing compound in the recirculation flow path is less than the predetermined threshold, activate at least one recirculation oxidation unit and a recirculation pumping device to recirculate a complete storage reservoir volume.

17. The water treatment and storage system of claim 1, wherein the controller is further configured to control the operation of the water treatment and storage system based on a water quality parameter value selected from a group of acidity, alkalinity, total hardness, conductivity, calcium concentration, pH, microbe concentration, carbon dioxide ($CO_2$) concentration, total dissolved solids (TDS), turbidity, temperature, or a combination thereof.

18. The water treatment and storage system of claim 1, wherein the additive unit is configured to add a mineral comprising magnesium, potassium, sodium, magnesium carbonate, calcium magnesium carbonate, dolomitic limestone, calcareous dolomite, dolomite, magnesium oxide, magnesium sulfate, potassium hydrogen carbonate, potassium bicarbonate, sodium hydrogen carbonate, calcium chloride, a carbon dioxide generating compound a derivative or a combination thereof.

19. The water treatment and storage system of claim 1, wherein the controller is configured to:
determine if a total dissolved solids (TDS) of the water in the recirculation flow path is less than a predetermined threshold; and
in response to determining the total dissolved solids (TDS) of the water in the recirculation flow path is less than the predetermined threshold, activate the additive unit to add the one or additives in the recirculation flow path.

20. The water treatment and storage system of claim 1, wherein the controller is configured to:
determine if a pH of water in the recirculation flow path is less than a predetermined threshold; and
in response to determining the pH of the water in the recirculation flow path is less than the predetermined threshold, activate the additive unit to add a carbonate additive in the recirculation flow path.

21. The water treatment and storage system of claim 20, wherein a predetermined pH threshold is below a pH value of 7.

22. The water treatment and storage system of claim 1, wherein the water source is an atmospheric water generator; and, wherein the controller is configured to recirculate the water in the storage reservoir during time periods of low source water generation from the atmospheric water generator.

23. A method for operating a water treatment and storage system comprising:
supplying water from a water source to a water treatment flow path of the water treatment and storage system, the water treatment flow path including a primary water treatment flow path to receive water from the water source and direct the water in a recirculation flow path to a storage reservoir;
exposing the water to an oxidizing agent comprising ozone in the water treatment flow path;
adding one more additives into the water in the water treatment flow path;
controlling, by a controller, an operation of the water treatment and storage system in a plurality of modes including:
a primary water treatment mode wherein the water is directed through the primary water treatment flow path and a through portion of the recirculation flow path in advance of the storage reservoir;
a recirculation maintenance mode wherein the water is directed from the storage reservoir, through the recirculation flow path and back to the storage reservoir; and,
a mixed water treatment mode wherein the water is directed through the primary water treatment flow path to a portion of the recirculation flow path in advance of the storage reservoir, and wherein the water is directed from the storage reservoir through the recirculation flow path; and,
maintaining, by the controller, at least one of:
an ozone CT value in a first range of 0.2 to 5.5 as a function of temperature in a second range of 50 degrees Celsius to 5 degrees Celsius; and
a concentration of ozone above a concentration value of 0.25 ppm in the water treatment flow path.

24. The method of claim 23, wherein supplying the water from the water source to the water treatment flow path comprises generating water from ambient air by an atmospheric water generator.

25. The method of claim 23, wherein adding one more additives into the water in the water treatment flow path comprises injecting a calcium compound, a magnesium compound, a pH-adjusting agent or a combination thereof.

26. The method of claim 23, further comprising sensing a water quality parameter comprising acidity, alkalinity, total hardness, conductivity, calcium concentration, pH, $CO_2$ concentration, microbe concentration, total dissolved solids (TDS), turbidity, temperature, or a combination thereof.

27. The method of claim 23, further comprising:
determining, based on a sensed water conditions from a sensor, a quantity of the oxidizing agent in the water flowing in the water treatment flow path; and
adjusting a time of exposure of the water to the oxidizing agent based on the quantity of the oxidizing agent in the water flowing in the water treatment flow path.

28. The method of claim 23, further comprising:
determining a flow rate of water input to the primary water treatment flow path from the water source is above a predetermined threshold; and
activating a first oxidation unit if the flow rate of water input from the water source is above the predetermined threshold.

29. The method of claim 23, further comprising:
determining if a total dissolved solids (TDS) in the water in the recirculation flow path is below a predetermined threshold; and
in response to determining the TDS is below the predetermined threshold, activate an additive unit to add a calcium compound, a magnesium compound, or a combination thereof into the water flowing in the recirculation flow path.

30. The method of claim 23, further comprising:
determining if a pH value of the water in the recirculation flow path is below a predetermined threshold; and
in response to determining the pH value of the water in the recirculation flow path is below the predetermined threshold, activate an additive unit to add one or more pH adjusting compounds into the water flowing in the recirculation flow path.

31. The method of claim 23, further comprising:
determining if an ozone CT value in the primary water treatment flow path is above 2; and
in response to determining the ozone CT value in the primary water treatment flow path is above 2, distribute the water from a primary treatment flow path to at least a portion of the recirculation flow path.

32. The method of claim 23, further comprising:
determining a water level in the storage reservoir; and
activating a recirculation pumping device to flow the water along the recirculation flow path at a flow rate based on the water level in the storage reservoir.

33. The method of claim 23, further comprising:
determining if a predetermined time period has lapsed;
activating a recirculation pumping device to flow the water along the recirculation flow path if the predetermined time period has lapsed; and
activate a recirculation oxidation unit to generate oxidative conditions in the water flowing in the recirculation flow path if the predetermined time period has lapsed.

34. A system for providing water to a user for consumption comprising:
a water production system for generating water from air;
a water treatment and storage system comprising a water treatment flow path including a primary water treatment flow path for receiving generated water and direct the water in a recirculation flow path to a storage reservoir;
a controller to control the system in a plurality of modes including:
a primary water treatment mode wherein the water is directed through the primary water treatment flow path and a through portion of the recirculation flow path in advance of the storage reservoir;
a recirculation maintenance mode wherein the water is directed from the storage reservoir, through the recirculation flow path and back to the storage reservoir; and,
a mixed water treatment mode wherein the water is directed through the primary water treatment flow path to a portion of the recirculation flow path in advance of the storage reservoir, and wherein the water is directed from the storage reservoir through the recirculation flow path;
wherein the oxidizing compound is ozone,
wherein the controller is configured to maintain at least one of:
an ozone CT value in a first range of 0.2 to 5.5 as a function of temperature in a second range of 50 degrees Celsius to 5 degrees Celsius; and
a concentration of ozone above a concentration value of 0.25 ppm in the water treatment flow path.

35. A method for providing water to a user for consumption comprising:
generating, by one or more water generating units, water from air;
supplying generated water to a water treatment flow path of a water treatment and storage system, the water treatment flow path including a primary water treatment flow path to receive water from the water source and direct the water in a recirculation flow path to a storage reservoir;
exposing the water to an oxidizing agent comprising ozone in the water treatment flow path;
adding one more additives into the water in the water treatment flow path;
controlling, by a controller, an operation of the water treatment and storage system in a plurality of modes including:
a primary water treatment mode wherein the water is directed through the primary water treatment flow path and a through portion of the recirculation flow path in advance of the storage reservoir;
a recirculation maintenance mode wherein the water is directed from the storage reservoir, through the recirculation flow path and back to the storage reservoir; and,
a mixed water treatment mode wherein the water is directed through the primary water treatment flow path to a portion of the recirculation flow path in advance of the storage reservoir, and wherein the water is directed from the storage reservoir through the recirculation flow path; and,
maintaining, by the controller, at least one of:
an ozone CT value in a first range of 0.2 to 5.5 as a function of temperature in a second range of 50 degrees Celsius to 5 degrees Celsius; and
a concentration of ozone above a concentration value of 0.25 ppm in the water treatment flow path.

* * * * *